(12) United States Patent
Mirchandani et al.

(10) Patent No.: US 9,020,839 B1
(45) Date of Patent: *Apr. 28, 2015

(54) METHOD, MEDIUM, AND SYSTEM FOR CUSTOMIZING CONTENT BASED ON SOCIAL NETWORK INFORMATION

(71) Applicant: Amazon Technologies, Inc., Seattle, WA (US)

(72) Inventors: Jeetendra Mirchandani, Bellevue, WA (US); Sumit Kumar Sultania, Seattle, WA (US); Vinayak R. Hegde, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 96 days.

This patent is subject to a terminal disclaimer.

(21) Appl. No.: 13/723,076

(22) Filed: Dec. 20, 2012

Related U.S. Application Data

(63) Continuation of application No. 12/871,733, filed on Aug. 30, 2010, now Pat. No. 8,355,955.

(51) Int. Cl.
*G06Q 30/00* (2012.01)
*G06Q 30/06* (2012.01)

(52) U.S. Cl.
CPC ........ *G06Q 30/0641* (2013.01); *G06Q 30/0603* (2013.01)

(58) Field of Classification Search
USPC ............................... 705/26.1, 26.7, 27.1, 319
See application file for complete search history.

(56) References Cited

U.S. PATENT DOCUMENTS

| | | | |
|---|---|---|---|
| 5,717,923 A * | 2/1998 | Dedrick | 1/1 |
| 6,853,982 B2 | 2/2005 | Smith et al. | |
| 6,889,250 B2 | 5/2005 | Bezos et al. | |
| 7,082,407 B1 | 7/2006 | Bezos et al. | |
| 7,194,419 B2 | 3/2007 | Robertson et al. | |
| 7,310,612 B2 | 12/2007 | McQueen, III et al. | |
| 7,356,490 B1 | 4/2008 | Jacobi et al. | |
| 7,478,054 B1 | 1/2009 | Adams et al. | |
| 7,483,846 B1 | 1/2009 | Kumar et al. | |
| 7,536,322 B1 | 5/2009 | Selinger et al. | |
| 7,664,669 B1 | 2/2010 | Adams et al. | |

(Continued)

OTHER PUBLICATIONS

Aug. 31, 2007-http://www.searchenginejournal.com/social-medias-direct-influence-on-search-engine-rankings/5576/.*

(Continued)

*Primary Examiner* — Matthew Zimmerman
(74) *Attorney, Agent, or Firm* — Knobbe, Martens, Olson & Bear, LLP

(57) ABSTRACT

Systems and methods are disclosed that use social networking profiles of users to generate personalized content of display pages. The personalized content may be generated using profile data retrieved via an application program interface of a social networking system, and may be presented on the display pages of a distinct system, such as a site that hosts an electronic catalog of items. The personalized content may include features that allow a user to indicate a like or preference for an item and that can be customized based on, e.g., the extent of the user's social network or the influence the user has over other potential users of the catalog system. Systems and methods are also disclosed that use the social networking profiles to generate personalized messages that can be posted to social network contacts of the user to provide information about items for which the contacts may be interested.

20 Claims, 15 Drawing Sheets

(56) References Cited

U.S. PATENT DOCUMENTS

| | | |
|---|---|---|
| 7,672,868 B1 | 3/2010 | Keller et al. |
| 7,698,173 B1 * | 4/2010 | Burge et al. .................. 705/26.5 |
| 8,355,955 B1 | 1/2013 | Mirchandani et al. |
| 2002/0019763 A1 | 2/2002 | Linden et al. |
| 2004/0078432 A1 | 4/2004 | Manber et al. |
| 2005/0038717 A1 | 2/2005 | McQueen, III et al. |
| 2005/0171832 A1 | 8/2005 | Hull et al. |
| 2007/0260520 A1 | 11/2007 | Jha et al. |
| 2008/0040475 A1 | 2/2008 | Bosworth et al. |
| 2008/0082491 A1 | 4/2008 | Scofield et al. |
| 2008/0189188 A1 | 8/2008 | Morgenstern |
| 2008/0215348 A1 | 9/2008 | Guldimann et al. |
| 2009/0006373 A1 | 1/2009 | Chakrabarti et al. |
| 2009/0048921 A1 | 2/2009 | Tokuda et al. |
| 2009/0119167 A1 | 5/2009 | Kendall et al. |
| 2010/0010822 A1 | 1/2010 | Bal et al. |
| 2010/0185507 A1 | 7/2010 | Tokuda |
| 2010/0318919 A1 | 12/2010 | Murphy et al. |
| 2011/0202606 A1 | 8/2011 | Agarwal et al. |

OTHER PUBLICATIONS

Schafer, et al.: "E-Commerce Recommendation Applications", Data Mining and Knowledge Discovery, vol. 5, pp. 115-153, Kluwer Academic Publishers, 2001.

Baker, L., "Social Media's Direct Influence on Search Engine Ranking," Search Engine Journal, in 10 pages, Aug. 31, 2007.

* cited by examiner

*140*

```
Catalog.com    Hello, Chris Customer                          Your Account | Help
┌─────────────────────┬──────────────────────────────────┬──────────┐
│ Shop All Departments│ Search [▼][          ](GO)       │ Cart  [▼]│
└─────────────────────┴──────────────────────────────────┴──────────┘

Sign In

Sign In and Connect to Social Net    What is your e-mail address?

To protect your privacy, you need to sign in    My e-mail address is [Chris@xyz.com]
   to your Catalog.com account before
   connecting to Social Net.            Do you have a Catalog.com password?

148                                     ○ No, I am a new customer      144
   Once you're signed in and connected,
   Catalog.com will be able to seamlessly post    ● Yes, my password is [●●●●●]
   items you like to your Social Net Wall.

Catalog.com will never post anything to    [ Sign In ]
   your Social Net Wall without your consent.
```

FIG. 2B

METHOD, MEDIUM, AND SYSTEM FOR CUSTOMIZING CONTENT BASED ON SOCIAL NETWORK INFORMATION

CROSS-REFERENCE TO RELATED APPLICATIONS

This application is a continuation of U.S. patent application Ser. No. 12/871,733, filed Aug. 30, 2010, entitled "METHOD, MEDIUM, AND SYSTEM FOR ADJUSTING A SELECTABLE ELEMENT BASED ON SOCIAL NETWORKING USAGE," now U.S. Pat. No. 8,355,955, which is hereby incorporated by reference herein in its entirety.

BACKGROUND

Customers of e-commerce sites, such as online web sites of merchants, can be presented with display pages (e.g., web pages) that describe products or services that are available from the e-commerce site. In some cases, the e-commerce site may use information about the customer's shopping preferences, purchase history, product viewing history and so forth to personalize the content or appearance of a display page (e.g., a home page, detail page, or search results page) that is presented to the user (e.g., via a web browser or other type of user interface).

It is becoming increasingly common for customers of e-commerce sites to also be members of a social networking site, which maintains profile information for the members of the site. Member profile information can include information about social connections between the member and other persons, organizations, and entities (e.g., the member's social network). The member profile information may also include information about preferences of the member (e.g., likes or dislikes) for media (e.g., movies, music, or video games), products, services, activities, etc. Very little integration currently exists between existing e-commerce sites and social networking sites.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 2B illustrates an example format of a login or sign-in page that may be used to allow a customer to connect the customer's account on the electronic catalog system with the customer's account on the social networking system.

FIG. 4A is an example format of a "wall" that allows the member and the member's friends or contacts to post content such as comments, photos, videos, etc. FIG. 4B is an example format of a "news feed" that presents the most recent or relevant messages and postings for the member.

DETAILED DESCRIPTION OF SPECIFIC EMBODIMENTS

E-commerce systems and social networking systems typically have been separate systems that have not shared customer information and user profile information. It may be advantageous if an e-commerce system can use, with the permission of a customer, the customer's profile information from the social networking site in order to provide a more personalized experience when the customer visits the e-commerce system. It may also be advantageous if the e-commerce system can use, with customer permission, the customer's profile information to determine information about products and services that may be of interest to the customer and/or others in the customer's social network. For example, the e-commerce system can communicate messages about such products and services to the wall or news feed of the customer and/or others in the customer's social network. Personalized display page content and/or messaging have the potential to increase traffic to a display page for an item or to generate additional purchases of the item from the e-commerce system, because the e-commerce system or its customers can communicate information about items that may be of interest to their social network contacts. Also, personalized display pages and messaging can provide links to detail pages for such items, which can make it easy for social networking contacts to visit and purchase from the e-commerce system.

Accordingly, various computer-implemented features are disclosed for integrating an electronic catalog system, such as a system that hosts an e-commerce site, with a social networking system. In some embodiments, systems and methods use profile data retrieved from the social networking system to automatically personalize the content or appearance of a display page or to automatically determine interactions (e.g., messaging) between an e-commerce system and the social networking system. These features may be embodied individually or in any combination in a web site system or other type of interactive system that provides access to an electronic catalog or other repository of items. For example, the disclosed features may be implemented by a shopping system so that when a customer visits the shopping system, the customer is presented with display pages (e.g., web pages) that are personalized or customized based on, for example, the customer's usage of the social networking system. Additionally or alternatively, the shopping system may use profile information obtained from the social networking system to determine, for example, the content or timing of marketing or informational messages communicated from the shopping system to users of the social networking system who may be current or potential customers of the shopping system.

I. EXAMPLE SYSTEM (FIG. 1)

Figure 1:
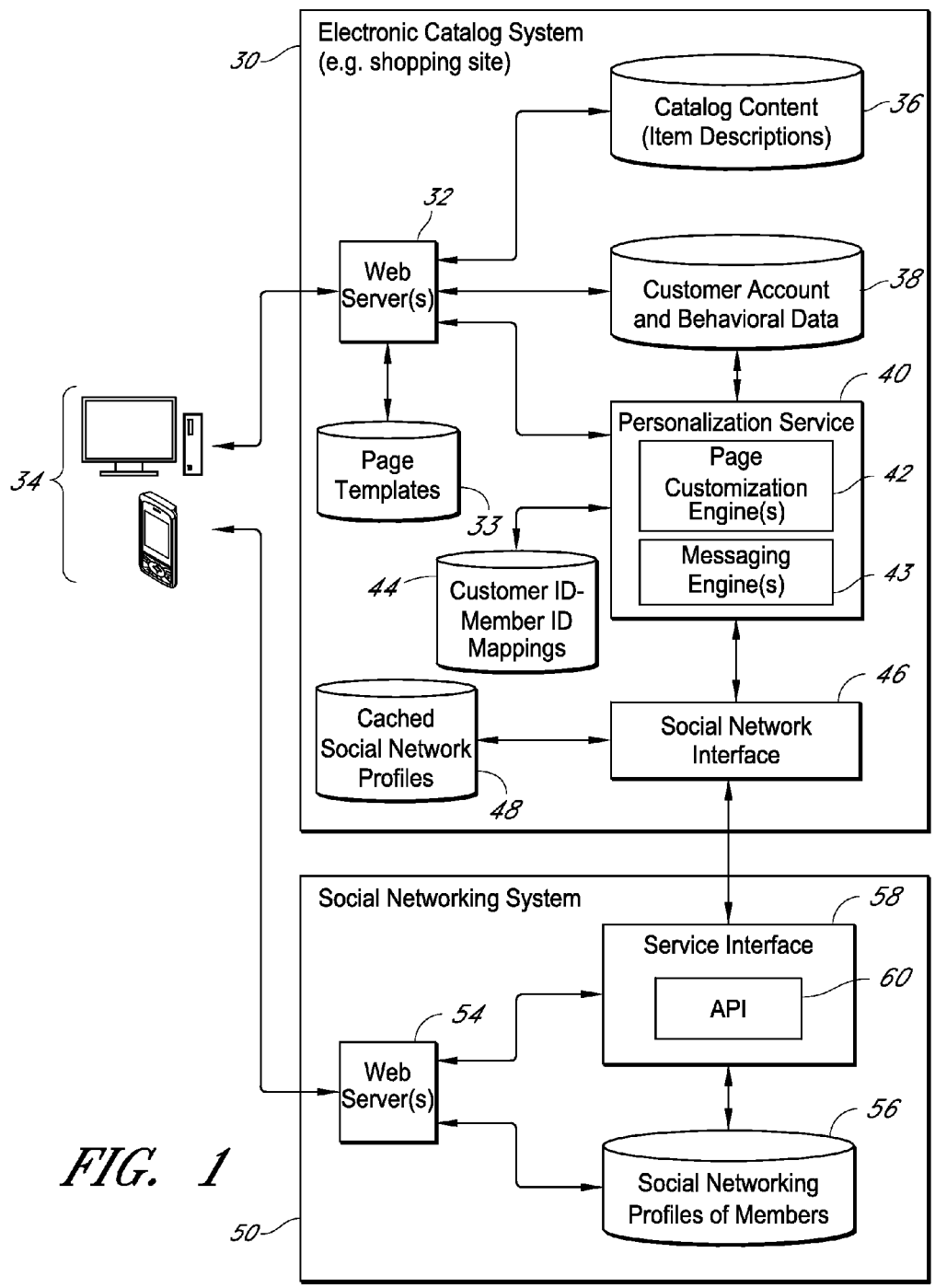
FIG. 1 schematically illustrates an embodiment of an electronic catalog system that generates personalized content, including display pages, using profile information received from a social networking system. The electronic catalog system can also communicate messages to the social networking system based on the profile information.

FIG. 1 schematically illustrates one embodiment of an electronic catalog system 30 that implements the above and other features. The electronic catalog system may be implemented as a computerized system that comprises multiple programmed computing devices (e.g., web server machines, application servers, storage servers, load balancers, etc.) that communicate over one or more networks. The electronic catalog system 30 hosts a web site that provides functionality for users to browse an electronic catalog of items that are available for purchase. The Amazon.com web site is one example of such a site. The items represented in the catalog may include, for example, physical products, music downloads, video downloads, software applications, magazine subscriptions, mobile service plans, and other types of items that can be purchased. Although described in the context of a web site, the inventive features described herein can also be implemented in other types of interactive systems, including interactive television systems. Further, although described in the context of products that are available for purchase, the disclosed features are also applicable to other types of items, including services, news articles, blogs, web sites, and television shows.

As illustrated in FIG. 1, the electronic catalog system 30 includes one or more web servers 32 that respond to page requests received over the internet from user computing devices 34 (e.g., personal computers, portable computing devices, mobile phones, electronic book readers, PDAs, etc.) of end users. The system 30 also includes a repository of catalog content 36. The catalog content may include, for example, product images, product descriptions, user ratings and reviews of particular products, price and availability data, seller data, etc. A search engine (not shown) enables users to search the catalog by submitting free-form search strings.

The catalog system 30 also includes a repository 38 of customer account data for users who have created accounts with the system ("customers"). Customer account data may include, for example, usernames, passwords, payment information, shipping information, item ratings, and wish lists. The repository 38 may also include various types of collected behavioral data reflective of the customer's browsing activity. The behavioral data may include item selection data for items selected by users of the catalog system. For example, the item selection data may include purchase histories, search histories, and item detail page viewing histories. Purchase histories can include purchases or rentals of items for physical delivery or electronic download (e.g., music or video downloads). As will be discussed further below, the item selection data can also include likes and preferences of the customer for items, authors, artists, directors, genres, etc. For example, the item selection data may include information on whether the customer (or those in the customer's social network) has indicated a "like" for an item.

As shown in FIG. 1, the electronic catalog system 30 also includes a personalization service 40 that generates personalized or customized content, including personalized display pages, for users of the system 30. The personalization service 40 may also provide for customized programmatic interaction between the electronic catalog system 30 and a social networking system 50. For example, the personalization service 40 may generate personalized messages for the social networking system 50 to distribute to certain members of the social networking system. The personalization service 40 may use social networking profile data retrieved from an external social networking system 50 to provide the personalization or customization of display pages or messaging (as described below).

The personalization service 40 includes one or more display page customization engines 42 for customizing or personalizing the appearance or content of a display page presented to a customer of the system 30. For example, a display page can include a web page that is displayed by a web browser (or other user interface) when a customer visits the web site hosted by the electronic catalog system 30. Such customized or personalized display pages can include a home or login page (when the customer first accesses the website), detail pages for specific items in the electronic catalog, search pages that allow users to search for desired items or services, or recommendation pages that are generated in response to a user's request for recommendations. Display pages can also include popup pages, popovers, hover pages, and so forth that are presented when a user views a web page. Examples of display pages are discussed with reference to FIGS. 2A-2F and 3A-3C. The personalization service 40 can include one or more messaging engines 43 for generating personalized messages for the social networking system 50 to distribute to certain members of the social networking system 50. Although the embodiment of the catalog system 30 illustrated in FIG. 1 includes both page customization engines 42 and messaging engines 43, other embodiments of the system 30 may include page customization engines 42 (but not messaging engines 43) or may include messaging engines 43 (but not page customization engines 42). Further, in other embodiments, the system 30 can be configured differently than shown in FIG. 1. For example, the page customization engines 42 and/or the messaging engines 43 may be separate components and not included in a personalization service 40. Many variations and alternatives are possible, and no single component or group of components is essential or required to be present in every embodiment of the system 30.

As explained below, the personalization service 40 may be invoked in a variety of different contexts to provide personalized display pages to users of the electronic catalog system 30 or to provide personalized messages to users of the social networking system 50.

The electronic catalog system 30 may associate with each customer of the system 30 a unique customer identifier, token, or key (e.g., a "customer ID"). The customer ID is used by the system 30 to access the customer account data from the repository 38. To protect the privacy of customers, the customer ID does not include any information that would allow the customer to be personally identified from the customer ID.

The electronic catalog system 30 may also include functionality and components (not shown) for enabling users to perform various other types of functions, including but not limited to the following: (a) purchasing items selected from the electronic catalog, (b) creating wish lists of items selected from the catalog, and searching for and viewing the wish lists of other users, (c) conducting keyword searches for specific catalog items, (d) browsing the catalog using a category-based browse tree, (e) creating personal profiles that are viewable by other users, (f) posting items for sale in the electronic catalog, (g) tagging specific catalog items, and (h) posting customer reviews and ratings of particular catalog items.

As further depicted in FIG. 1, the electronic catalog system 30 also includes a social network interface 46 that is capable of communicating (over the Internet and/or another data network) with an external social networking system 50. The social networking system 50 hosts a social networking web site that provides functionality for users to set up social networking accounts (to become "members"), and to establish contact or "friend" relationships with other members. Examples of such social networking systems and web sites include Facebook™, MySpace™, Mixi™, and LinkedIn™. To establish a contact or "friend" relationship via such a system, one member typically initiates the transmission of an invitation (also sometimes referred to as a "friend request" or "connection request") to another member by interacting with the social networking system 50. If the receiving member accepts this invitation (such as by clicking on an acceptance button or link), the social networking system 50 creates a database record or entry indicating that the two users are contacts of each other.

The social networking system 50 may be operated independently of (and by a different entity than) the electronic catalog system 30, and the two sites may operate in different Internet domains and on different hardware platforms. In other embodiments, the social networking system 50 may be an integral part of the electronic catalog system 30. Although a single social networking system 50 is shown in FIG. 1, the electronic catalog system 30 may interact with additional social networking systems in the same manner as described herein.

The social networking system 50 can include one or more web servers 54 that respond to page requests from user computing devices 34 by generating and serving display pages (e.g., web pages). These web pages provide functionality for users to create private and public social networking profiles to share personal information with their contacts and others. Each such member profile, which may be maintained in an appropriate data repository 56, typically includes multiple fields or sections, some of which relate to the user's interests or preferences. For example, text fields may be provided for entering the following information: name, birthday, hometown, favorite activities, favorite music, favorite books, favorite movies, favorite video games, favorite web sites, favorite clubs, favorite restaurants, favorite mobile applications. These fields are merely representative of the types of profile fields that may be provided.

The member profile information may also include other content (or information about such content) associated with the member such as, e.g., connections to other members, media (photos, videos, etc.), media or product reviews, fan pages, groups, hobbies, applications or games, status messages, postings by members, events, and so forth. Content in the member profile can be connected to other content in the member's profile by establishing one or more relationship connections between them. For example, if two members are in the same social network, the member profile information of each of these two members can indicate their relationship connection to be "friends." If a member indicates a preference for a particular item or object (e.g., a movie, a book, a photo), the item or object can be included in the member profile and the relationship connection between the member and the item may be an indication that the member "likes" the item. For example, as will be described below, a customer of the catalog system 30 can click a "like" button on a detail page for an item available from the catalog system to indicate the customer's preference for the item. The catalog system 30 can communicate this "like" to the social networking system 50, which can update the customer's member profile to include information about the item and the customer's preference for the item as well as publish the customer's preference for this item on the news feeds of the customer's social networking contacts.

The foregoing are merely examples of the types of content and the types of relationship connections that can be included in the member profile information. The content and relationship connections of the member profile may be organized as a "social graph" in some implementations of the system 50 (for example, the Facebook™ Social Graph). Member profile information can be stored in and retrieved from the data repository 56.

The social networking system 50 can provide functionality for a member to post a comment to, or indicate a preference the member shares with, other members in their common social network (e.g., the two users are "friends" on the social networking system). For example, a member may post a comment or indicate a preference on a friend's "wall" on the social networking system. Other users of the social networking system who are "friends" of these members can view (and comment on) postings to these walls. The social networking system 50 may provide functionality for communicating messages to members. The messages may come from the social networking system itself, other members, or other organizations or entities. Some social networking systems organize messages and postings into an individualized "news feed" that presents to each member the most recent or relevant messages and postings.

The social networking system 50 typically associates with each member of the system a unique membership identifier, token, or key (e.g., a "member ID"). To protect the privacy of members of the social networking system 50, the member ID typically does not include any information that would allow the member to be personally identified from the member ID. The member ID is used by the system 50 to access the member profile information and to organize and distribute appropriate content to individual members (e.g., to distribute content to a member's wall or news feed). To refer to members of a social network, the member profile typically uses member IDs (rather than personally identifiable information).

In the example shown in FIG. 1, the social networking system 50 includes a service interface 58, including an API (Application Programming Interface) 60, which enables external systems to retrieve member profile information and to post information to members' profiles. The electronic catalog system 30 uses this interface 58 to retrieve social networking profile information of particular members of the social networking system. For example, the system's social network interface 46 makes API calls to the social networking system 50 to request the social networking data of particular members of the social networking system.

When a customer gives permission to link the customer's catalog account (e.g., their account with the electronic catalog system 30) with the customer's social networking account, the social network interface 46 can make API calls that include the customer's social network log-in credentials (e.g., username and password), as supplied to the system 30 by the customer. The electronic catalog system 30 can then retrieve the customer's member profile information and member ID from the social networking system 50. Because the electronic catalog system 30 knows the customer's customer ID, the catalog system can make an association or mapping between the customer ID (on the catalog system 30) and the member ID (on the social networking system 50). The catalog system 30 can include a database 44 that includes such mappings or associations between customer IDs and member IDs for all customer's who have given the catalog system 30 permission to link their respective catalog and social networking accounts.

The personalization service 40 can use the customer ID-to-member ID mappings in a variety of ways. As discussed above, the member profiles retrieved from the social networking system 50 typically include member IDs (rather than personally identifiable information). The catalog system 30 can use the customer ID-to-member ID mappings to determine which, if any, of the member IDs referred to in member profile data are also customers of the catalog system 30 (e.g., have a customer ID associated with the member ID). If the catalog system 30 desires to target messages to particular customers who also have accounts on the social networking system, the catalog system 30 can determine the customers' member IDs on the social networking system from the mappings in database 44. The catalog system 30 can also determine which customers have social networking accounts by determining if there is a member ID associated with a given customer ID. Therefore, the catalog system 30 can use the database 44 to determine customer ID from member ID or to determine member ID from customer ID.

The electronic catalog system 30, and particularly the personalization service 40, can use the retrieved social networking profile information to provide customized content or appearance of display pages to the customer of the catalog system 30. Profile data retrieved from the social networking system 50 may be stored in a cache 48 to reduce the need for data retrieval requests, or may be persistently stored by the electronic catalog system. The electronic catalog system 30 may also use the social networking system's interface 58 to post information (e.g., personalized messages) to the social networking profiles of particular members. For example, the catalog system 30 may determine that if a particular customer buys an item, then the customer's social networking friends may also be potential customers for the item. The messaging engine 43 of the catalog system 30 may communicate a message about the item to the service interface 58 for posting on the walls or news feeds of the customer's social networking friends (e.g., using member IDs obtained from the customer's member profile). In some implementations of the social networking system 60, the message that is presented to a member may include a photo of the product or a hyperlink that allows the member to view or access a display page for the item from the catalog system 30 (e.g. by clicking on the photo or hyperlink).

The various components shown in FIG. 1 may be implemented in an appropriate combination of hardware and software. For example, the web servers 32 and 54 may be implemented using physical servers (with processors, memory, etc.) that are programmed with executable program code to respond to display page requests by generating and returning web pages. The personalization service 40, social network interface 46 and service interface 58 may similarly be implemented using programmed physical servers or general purpose computers.

II. EXAMPLE DISPLAY PAGES (FIGS. 2A-4B)

A. Like Button

FIGS. 2A to 2G and 3A to 3C illustrate examples of the format and content of representative display pages (e.g., web pages) that may be generated by the electronic catalog system 30 to provide a personalized "Like" button 130 for users of the system 30. The representative display pages are presented as they may appear, for example, in a web browser. The web pages may be generated by the web servers 32 (FIG. 1) using a repository of templates 33. As will be further described below, a user/customer can indicate that they "like" an item shown in the web page by clicking on the Like button 130. The history of a user or customer's "likes" can be tracked and stored as behavioral data in the repository 38.

For purposes of illustration in the figures, the fictitious names "Catalog.com" and "Social Net" are used in the display pages to refer to the electronic catalog system 30 and the social networking system 50, respectfully. In addition, the fictitious names Chris Customer and Kim Contact are used to refer, respectively to a particular user/customer of the electronic catalog system 30 and to a social network contact of this customer. In the example web pages shown, it is assumed that Chris, the customer viewing the illustrated web pages, (1) has accounts with both the electronic catalog system 30 and the social networking system 50, (2) has created a social network profile on the social networking system 50, and (3) has created contact relationships with other members of the social networking system, including Kim. Kim may, but need not, have an account with the electronic catalog system 30.

Figure 2A:
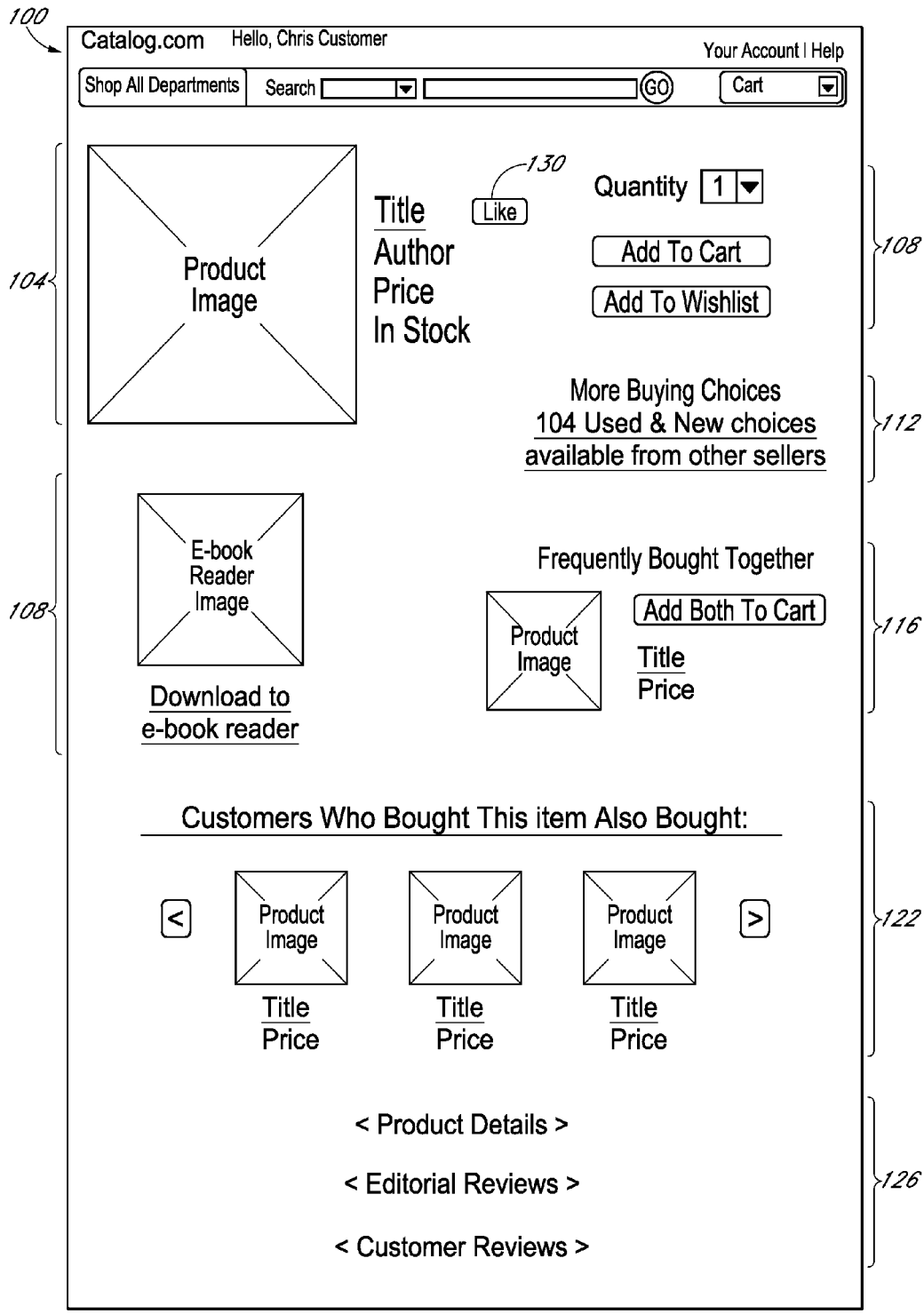
FIG. 2A illustrates an example format of a web page that may be generated by the electronic catalog system to provide a user functionality to indicate the user "likes" an item (e.g., by clicking a "Like" button).

FIG. 2A illustrates an example of an item detail page 100 as personalized for Chris. In this example, the item is a book, but in other examples, the item may be a movie, music download, consumer product, or any other product or service available from the catalog system 30. In other environments, the item represented on the item detail page may, for example, be a news story, news feed, web site, blog, author, musical artist, restaurant, or other type of item. The web page includes a number of distinct areas that can be used to display page features 104-126 that contain various types of content. Some or all of the page features 104-126 (or others not shown in the example web page illustrations) can be customized based on social networking profile information retrieved from the social networking system 50. The example page features 104-126 illustrated in FIG. 2A are intended to schematically illustrate certain types of page features that can be used on a display page but are not intended to be limiting. For example, the content, appearance, positioning, sizes, and so forth of the page features may be different than shown.

The example page feature 104 includes an image of the product and a brief description of the item (e.g., title, author, price, and whether the item is in stock). In this example, the Like button 130 is positioned near the title of the item. The size of the Like button 130 (relative to the size of the viewable area of the display page 100) and/or its positioning on the page 100 can be selected so that the Like button 130 is relatively easy for a user to find but not so large as to crowd other page features. Examples of interactions between the user/customer and the catalog system 30 after the user/customer selects the Like button 130 are described below with reference to FIGS. 2B-2F. In many user interfaces, the Like button 130 can be selected, for example, by moving a cursor to the button 130 and clicking a mouse or touchpad button on a user computing device 34 or by tapping the button 130 on a touchscreen.

In some implementations, the catalog system 30 may establish a "default" position, size, shape, and/or appearance for the Like button 130. For illustrative purposes, the Like button 130 as shown in FIG. 2A will be considered to be the "default" Like button for a detail page for a product. The presentation of the default Like button may be different for different types of display pages. For new users or for customers who have not chosen to link their catalog system accounts with a social networking account, the personalization service 40 may present the Like button 130 in its default form on a display page. For customers who have chosen to link their catalog system accounts with a social networking account, the personalization service 40 may use social networking information (e.g., social networking member profiles) to customize or personalize the presentation of the Like button 130 to the customer (see, e.g., FIGS. 3A-3C).

The page features 108-126 are examples of other types of information that can be presented to a user/customer. The page feature 108 is an area of the page 100 allowing a user/customer to add one (or more) quantities of the item to an electronic shopping cart or to a wishlist for future purchase. The page feature 108 may be presented prominently (and in a standard position) on the display page 100 so that the customer can easily order the item. The page feature 112 provides links to other sellers of the product, and the page feature 116 shows an additional item that is frequently purchased together with the product described in page feature 104. The page feature 118 provides functionality for a user/customer to download the item (a book, in this example) to an electronic book reader. The page feature 122 shows other items purchased by customers who also purchased the item described on the page 100. The page feature 126 includes areas for a detailed description, editorial reviews, and customer reviews of the item. Additional or different page features can be used in other display pages.

To protect the privacy of customers, the system 30 may establish an "opt-in" procedure by which a customer must affirmatively consent or authorize the electronic catalog system 30 to connect or link the customer's account on the catalog system 30 with the customer's account on the social networking system 50. If the customer's consent or authorization is not given, the catalog system 50 will not attempt to retrieve the customer's social networking profile information. In some such cases, the system 30 may thereafter deemphasize the appearance of the Like button 130 for this particular customer by, for example, moving the button to the bottom of display pages, reducing the size of the button (compared to the default Like button), or not presenting the Like button at all (on some or all display pages). In situations in which the Like button is presented to a non-consenting customer (e.g., the default Like button is used), the Like button 130 may have limited (or no) functionality when selected by the customer (unless the customer affirmatively consents at a later time). In other implementations, the system 30 may establish an "opt-out" procedure by which customer a customer can request that his or her social networking information is not accessed by the system 30.

The connection between a catalog system account and a social networking account can be established, for example, when the user/customer clicks the Like button 130. The actions following the click of the Like button 130 may depend on whether (or not) the user/customer is logged into the catalog system 30 or has an existing account with the system 30.

In some embodiments, if a user/customer who is not logged in to the catalog system 30 clicks the Like button 130, the user/customer may be first requested to log in (if already a customer) or to establish an account (if not already a customer). FIG. 2B illustrates an example format of a login or sign-in page 140 that may be used to allow a customer to log in or establish an account with the catalog system 30. If a customer already has an account, the customer can enter a username (e.g., an electronic mail address) and a password in section 144. The page 140 includes a section 148 that describes privacy protections and the types of actions the system 30 will not take without customer consent, and describes some of the advantages of connecting the user/customer's accounts on the catalog system and the social networking system.

Figure 2C:
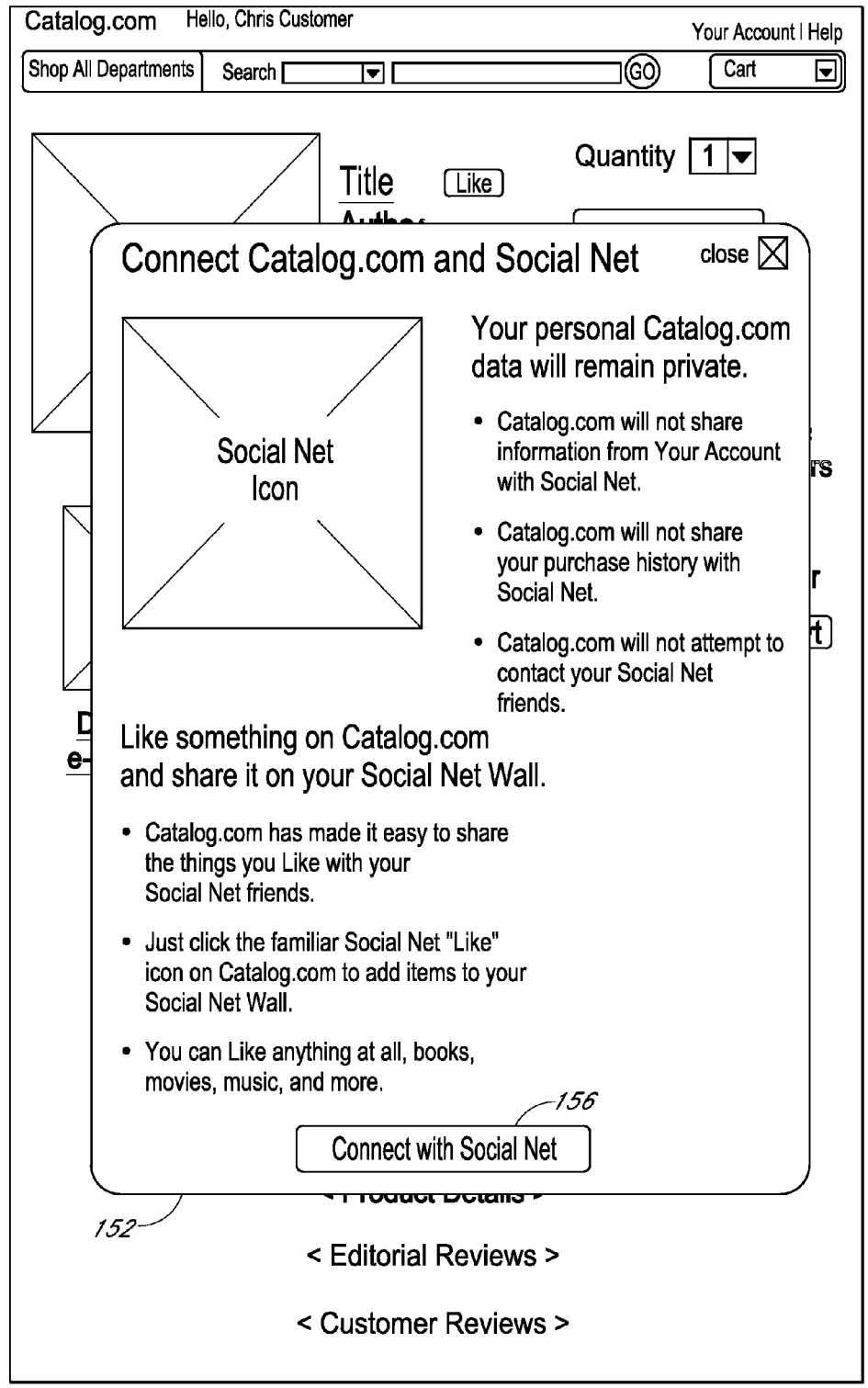
FIGS. 2C to 2E illustrate examples of popovers that may be displayed on the web page of FIG. 2A during the process in which the customer grants permission to the electronic catalog system to connect to the social networking system.
Figure 2D:
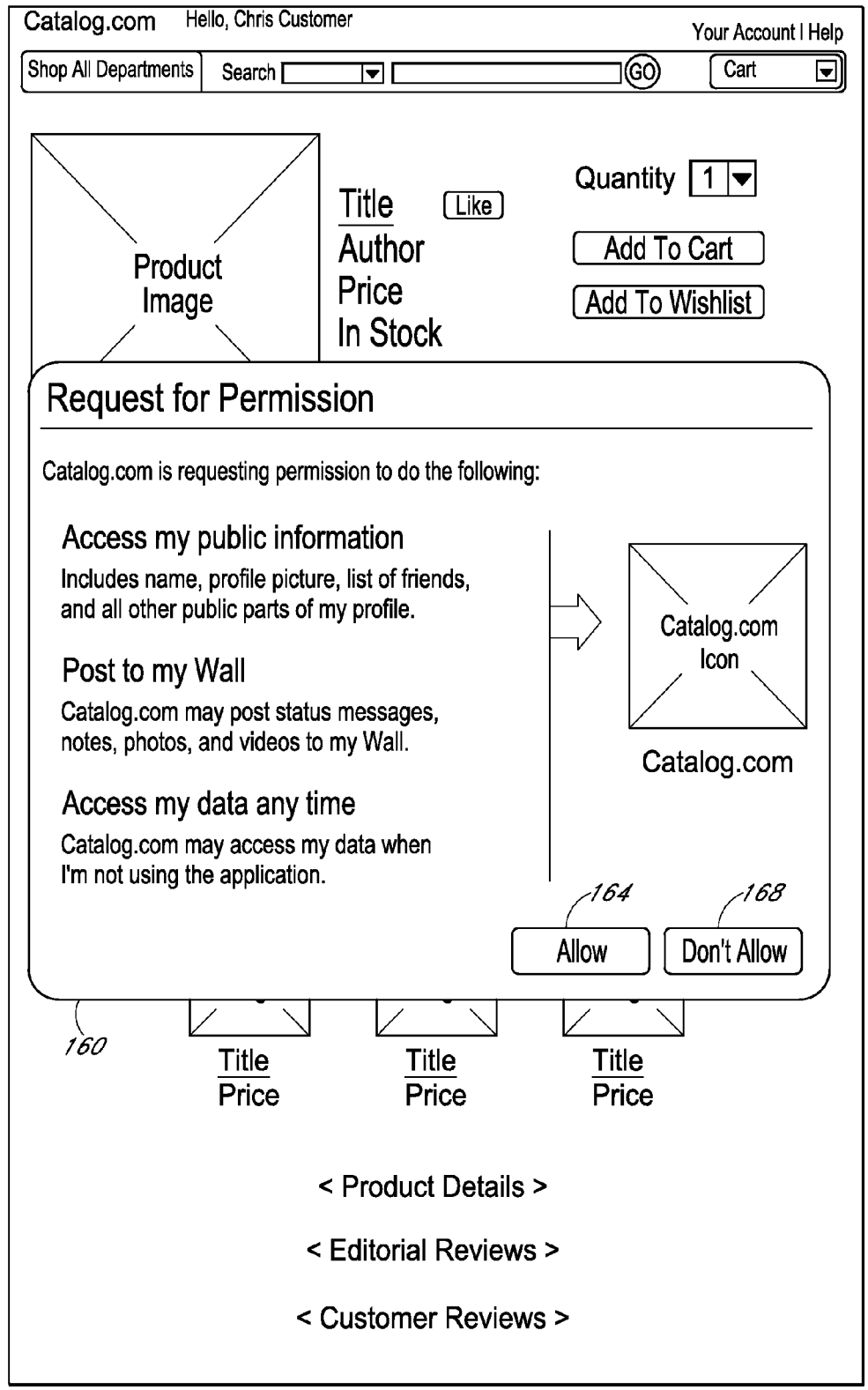
Figure 2E:
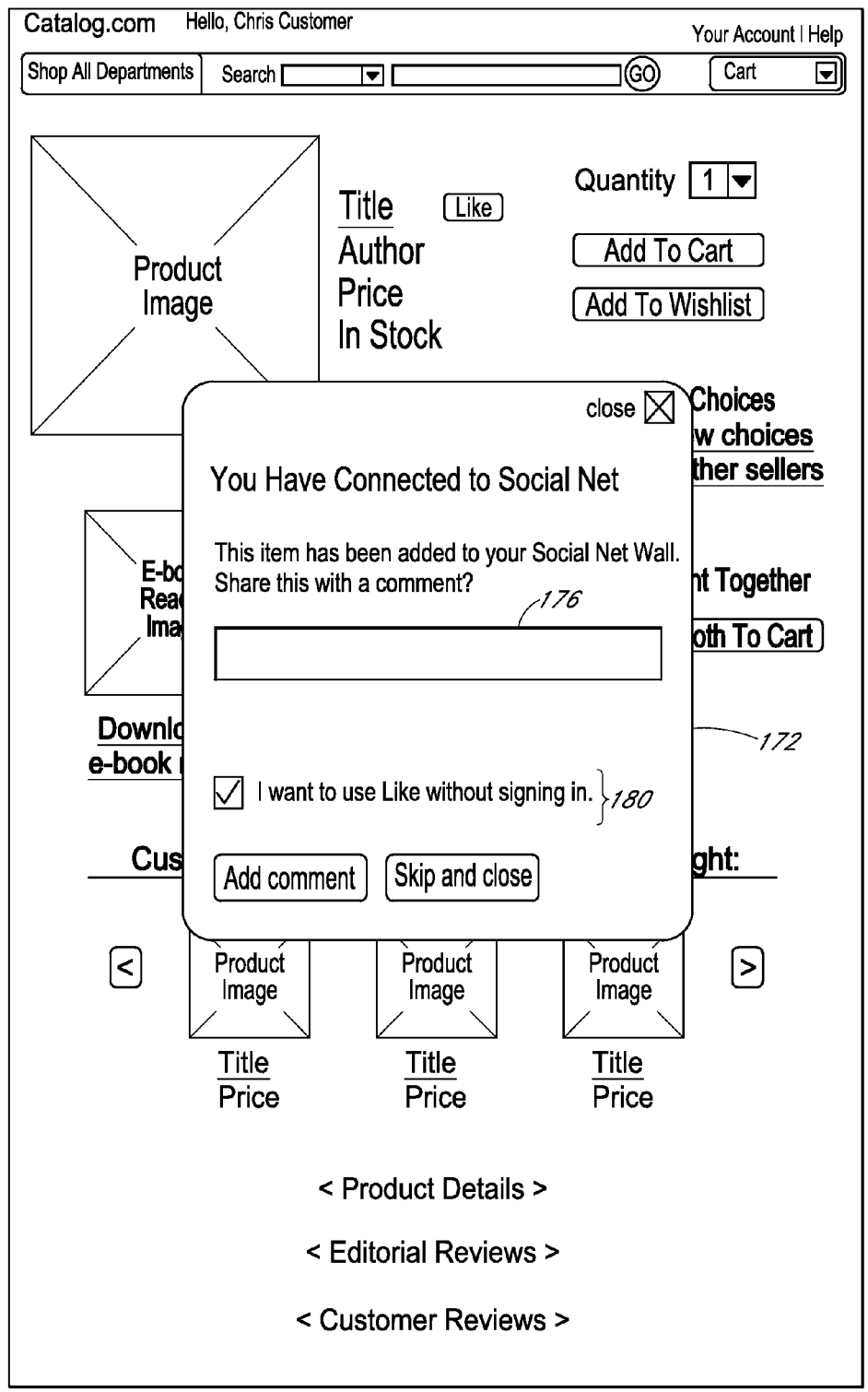
Figure 2F:
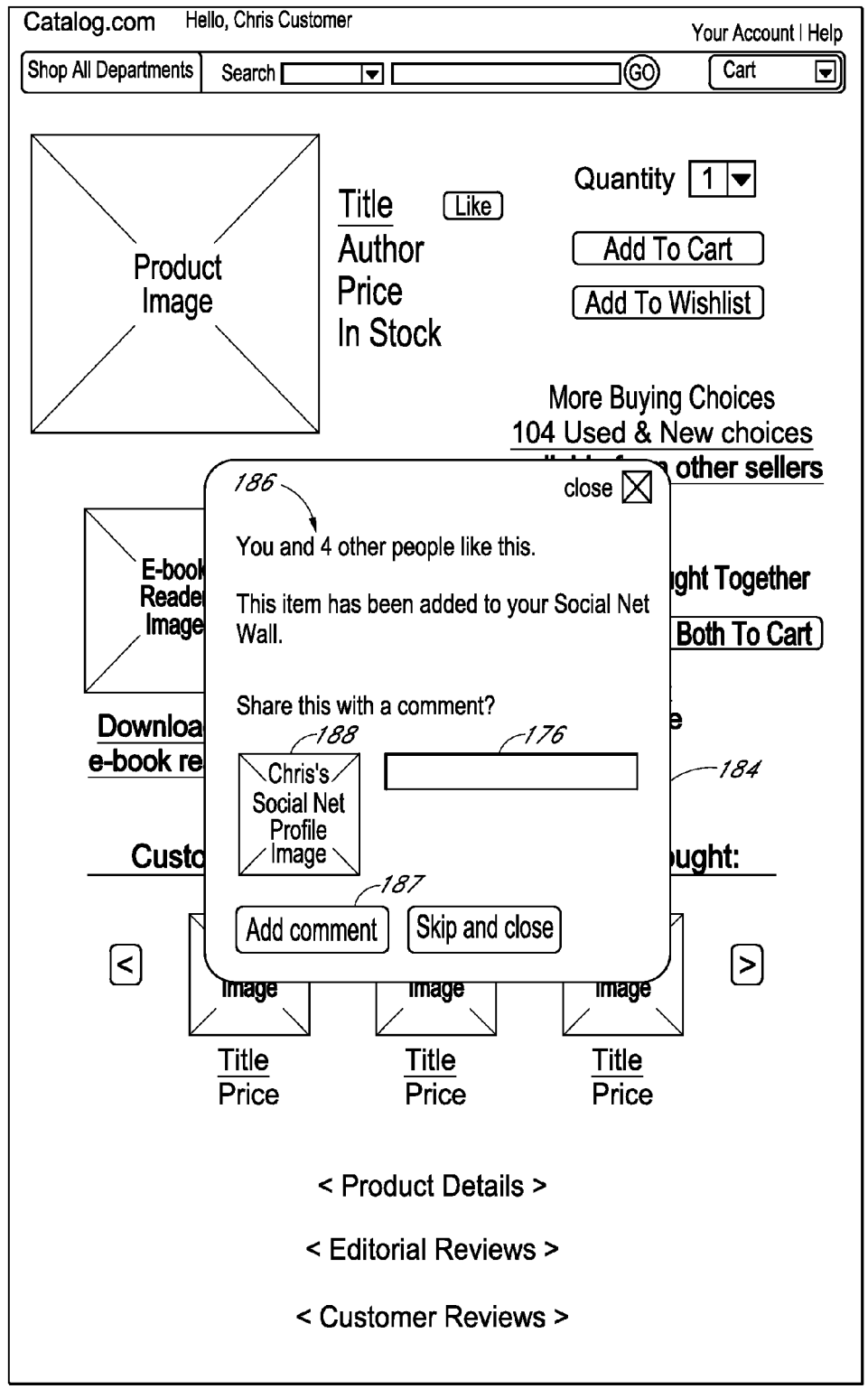
FIGS. 2F and 2G illustrate examples of popovers that may be displayed on the web page of FIG. 2A when a customer with a catalog system account that is connected to a social networking system account clicks the "Like" button of FIG. 2A.
Figure 2G:
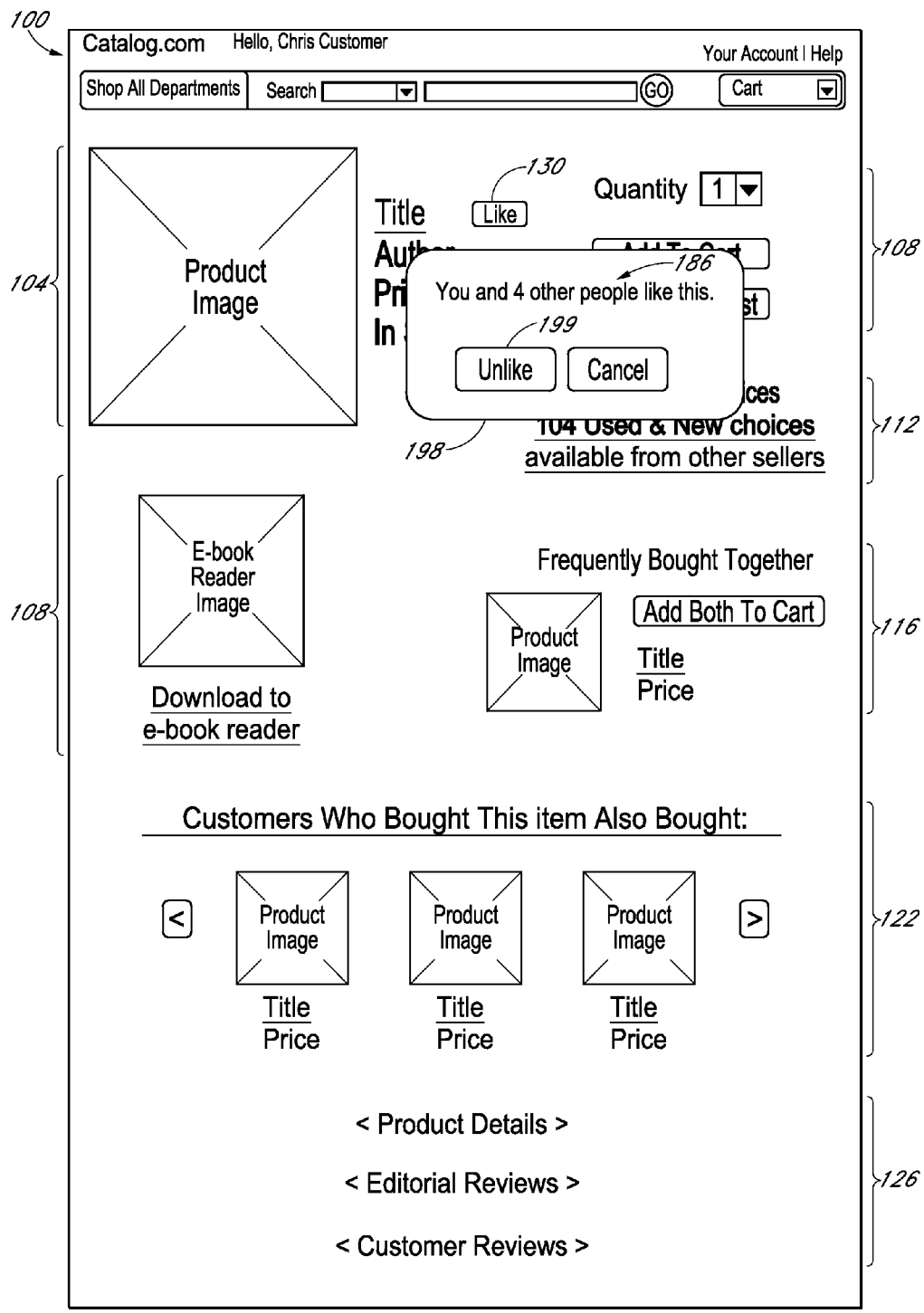

FIGS. 2C to 2E illustrate examples of popovers that may be displayed on the web page of FIG. 2A during the process in which a customer grants permission to the electronic catalog service 30 to connect to the social networking service 50. In this illustrative example, since Chris has an account with the catalog system 30, after clicking the sign-in button on the page 140 (FIG. 2B), Chris can be presented with a popover 152 that may be displayed over the product page 100 to which Chris had initially navigated (FIG. 2C). The popover 152 includes a description of the catalog system's policy to protect the privacy of customer's personal data and a description of how the customer can use the Like button functionality. Chris can click the button 156 to continue the connection process.

After clicking the button 156, Chris is presented with popover 160, which requests permission from Chris to connect his catalog system account and his social networking account. The popover 160 describes the actions the catalog system 30 will take if Chris consents to connecting his catalog system account with his social networking account (FIG. 2D). If Chris decides not to consent, Chris can click button 168, and the system 30 will not attempt to connect or link Chris's catalog system account to his social networking account. In this situation, the customer's social networking information will remain private and unavailable to the catalog system 30. As described above, in such a case, the Like button may have limited (or no) functionality or may be deemphasized on display pages.

If Chris decides to consent, Chris can click button 164, and the system 30 will take actions to connect the respective accounts. If Chris is not already logged in to the social networking system 50, the catalog system 30 may prompt Chris to authenticate that he has an account on the social networking system 50 (e.g., to authenticate that Chris is a member). For example, the catalog system 30 may use a popover (not shown) that allows Chris to enter his social networking username and password so that the system 30 can be authorized to access Chris's social networking profile data from the social networking system 50.

In the example catalog system 30 illustrated in FIG. 1, the social network interface 46 can use API calls to the service interface 58 of the social networking system 50 to establish the connection between Chris's catalog system account and his social networking system account. The catalog system 30 can retrieve Chris's member profile from the social networking system 50 and, in some implementations, store his member profile in cache 48.

After the connection has been made by the system 30, Chris may be presented with popover 172 that indicates the connection has been successfully made (FIG. 2E). In the illustrated embodiment, the popover 172 includes a text box 176 that allows Chris to post a comment to the wall of his social networking account. The popover 172 may also include a checkbox 180 that allows Chris to consent to use the functionality of the Like button without having to sign in to his social networking account when he visits the catalog system web site in the future. If Chris consents, the system 30 can use Chris's stored social networking authentication credentials (e.g., username and password) to automatically sign-in to the social networking site for Chris. If Chris does not consent, when he visits the catalog system in the future Chris may be presented with a sign-in popover (not shown) that permits his to sign-in to the social networking system 50 (if he is not already signed in).

In other embodiments, the catalog system 30 may set up additional or alternative ways to connect a catalog system account with a social networking account. For example, the system 30 may provide a dedicated display page to which users can navigate to connect their accounts, or the system 30 may present a button or link on display pages that direct the user/customer to a connection page (e.g., "Click here to connect to Social Net"). In some implementations, the social networking system 50 may include functionality for connecting a social networking account to an electronic catalog system account.

If a customer has already logged in to the catalog system 30 and has already consented to the connection between the respective accounts, the customer need not be presented with the sign-in page 140 shown in FIG. 2B and the popovers shown in FIGS. 2C-2E. In this case, after the customer clicks the Like button 130 (FIG. 2A), popover 184 shown in FIG. 2F may be presented to the customer. The example popover 184 includes an indicator 186 that Chris and others in his social network on the social networking system 50 liked the product described on the page 100 (FIG. 2A). The catalog system 30 can determine such information (e.g., that 4 others in his social network liked the product) by, for example, programmatically analyzing Chris's member profile retrieved from the social networking system 50 and/or customer account and behavioral data 38 (FIG. 1). The popover 184 may include an image 188 of Chris obtained from his member profile and may include a text box 176 for Chris to comment on the product. If Chris adds a comment to the text box 176, he can click button 187 and his comment will be automatically posted to the social networking system 50 (e.g., via API calls made by the social network interface 46). The social networking system 50 can present Chris's comment on his wall and his friends' news feeds (see, e.g., FIGS. 4A and 4B).

After having decided to "like" an item by clicking the Like button 130, a customer may at a later time decide that he or she does not like the item or has clicked the Like button 130 by mistake. The catalog system 30 may include functionality for a customer to "unlike" the item. FIG. 2H illustrates an example popup 198 that may appear for an item the customer likes. The popup 198 includes the indicator 186 that the customer and others in his social network liked the item and also includes an Unlike button 199. If the customer clicks the Unlike button 199, the catalog system 30 may remove information in its customer and behavioral data 38 that the customer likes the item. The catalog system 30 may also communicate the customer's preference to the social networking system 50 (e.g., via API calls to the service interface 58). The social networking system 50 may update the customer's member profile and remove previous comments or postings indicating the customer liked the item.

After having opted-in and authorized a connection between catalog and social networking accounts, a customer may change his or her mind and want to opt-out of the connection to the social networking system 50. The catalog system 30 may establish display pages (or links thereto) so that a customer can withdraw consent and de-link the respective accounts. After customer consent is withdrawn, the catalog system 30 may remove customer social networking information (e.g., username and password information) from the cache 48.

B. Customization of the Like Button on Display Pages

As will be discussed with reference to FIG. 5, the catalog system 30 can analyze the social networking information (e.g., member profiles) obtained from the social networking system 30 for customers who have consented to connect their respective accounts. Based at least in part on this analysis, the page customization engines 42 of the personalization service 40 can personalize or customize the appearance of page features on display pages presented to the customer. For example, characteristics of the Like button 130 including, but not limited to, appearance, positioning, content, and size can be customized based at least in part on the customer's usage of the social networking system (e.g., light user, moderate user, heavy user, or ability to influence other users) and/or the degree to which the customer (or the customer's social networking friends) are likely to select items from the catalog system 30.

As described above, FIG. 2A illustrates an example of the Like button 130 that may be used on pages describing items available for purchase from the catalog system 30. The appearance of the Like button 130 illustrated in FIG. 2A may represent a "default" appearance of the Like button 130 that can be used if the system 30 has little (or no) information about the social networking habits of the user or customer. The default appearance of the Like button 130 may also be used for customers who are relatively light users of the social networking system 50. The appearance and positioning of the default Like button 130 may be selected so that it is relatively easy for a user/customer to locate the button on a web page but not so large as to crowd other page features.

The system 30 may use behavioral data (from the repository 38) to determine that a particular customer rarely or never clicks on the Like button 130, has not clicked on the Like button 130 for a significant period of time, or typically clicks the Like button 130 for some genres (e.g., books) but not others (e.g., music). For certain such customers, the personalization service 40 may deemphasize the appearance of the Like button 130 (as compared to the default) by, for example, moving the button to the bottom of display pages (so the customer would have to scroll the page to locate the button), reducing the size of the button of the font size of the button text (compared to the default Like button), or not presenting the Like button at all (on some or all display pages). For example, if a customer frequently "likes" books and rarely or never "likes" music downloads, the personalization service may display the Like button 130 on item detail pages for books but may deemphasize the appearance of the Like button 130 on item detail pages for music downloads. If analysis of the customer's social networking member profile indicates renewed interest in social networking by the customer, the personalization service 40 may restore the presentation of the default Like button (or emphasize the button even more). In some implementations, after having deemphasized the Like button 130 for a customer, the personalization service 40 may, from time to time, present the Like button in its default (or other) appearance to provide such customers with future opportunities to access the Like functionality provided by the catalog system 30.

Figure 3A:
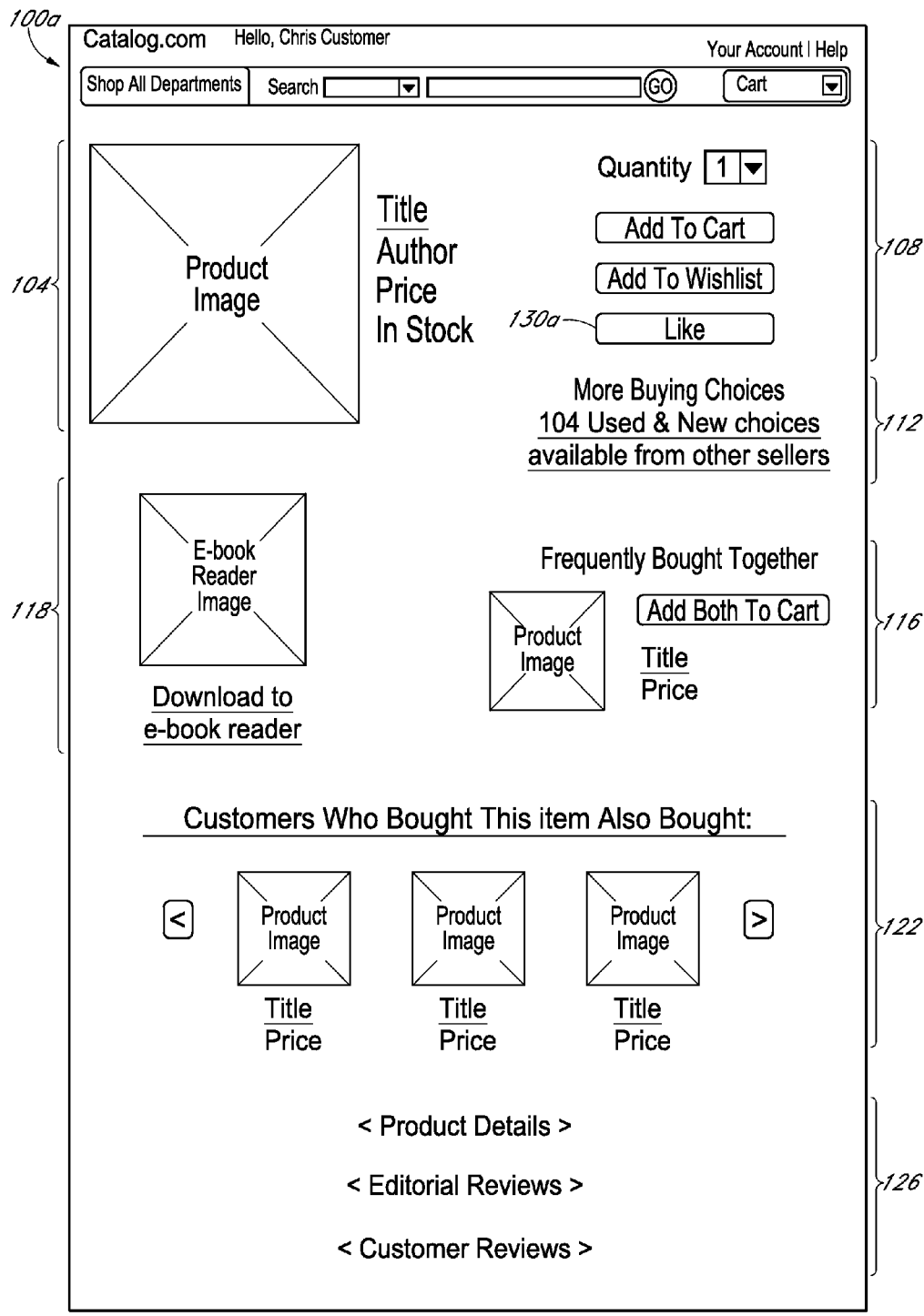
FIGS. 3A to 3C illustrate example formats of web pages that may be generated by the electronic catalog site to personalize the content and appearance of the web page based at least in part on the customer's usage of the social networking site (see also, FIG. 2A). The amount of content, the positioning, the appearance, and the size of the "Like" area change from FIG. 2A through FIG. 3C.
Figure 3B:
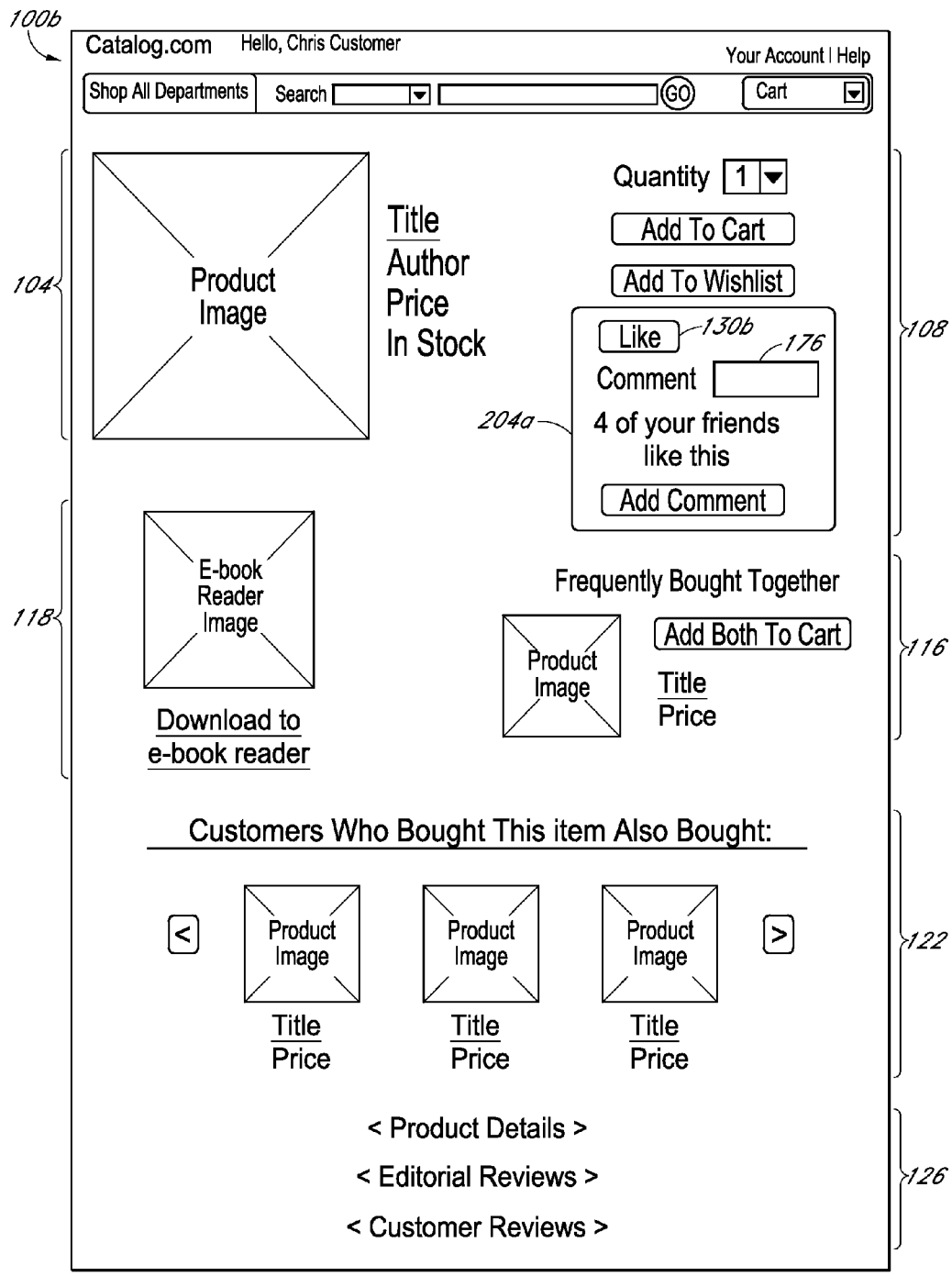
Figure 3C:
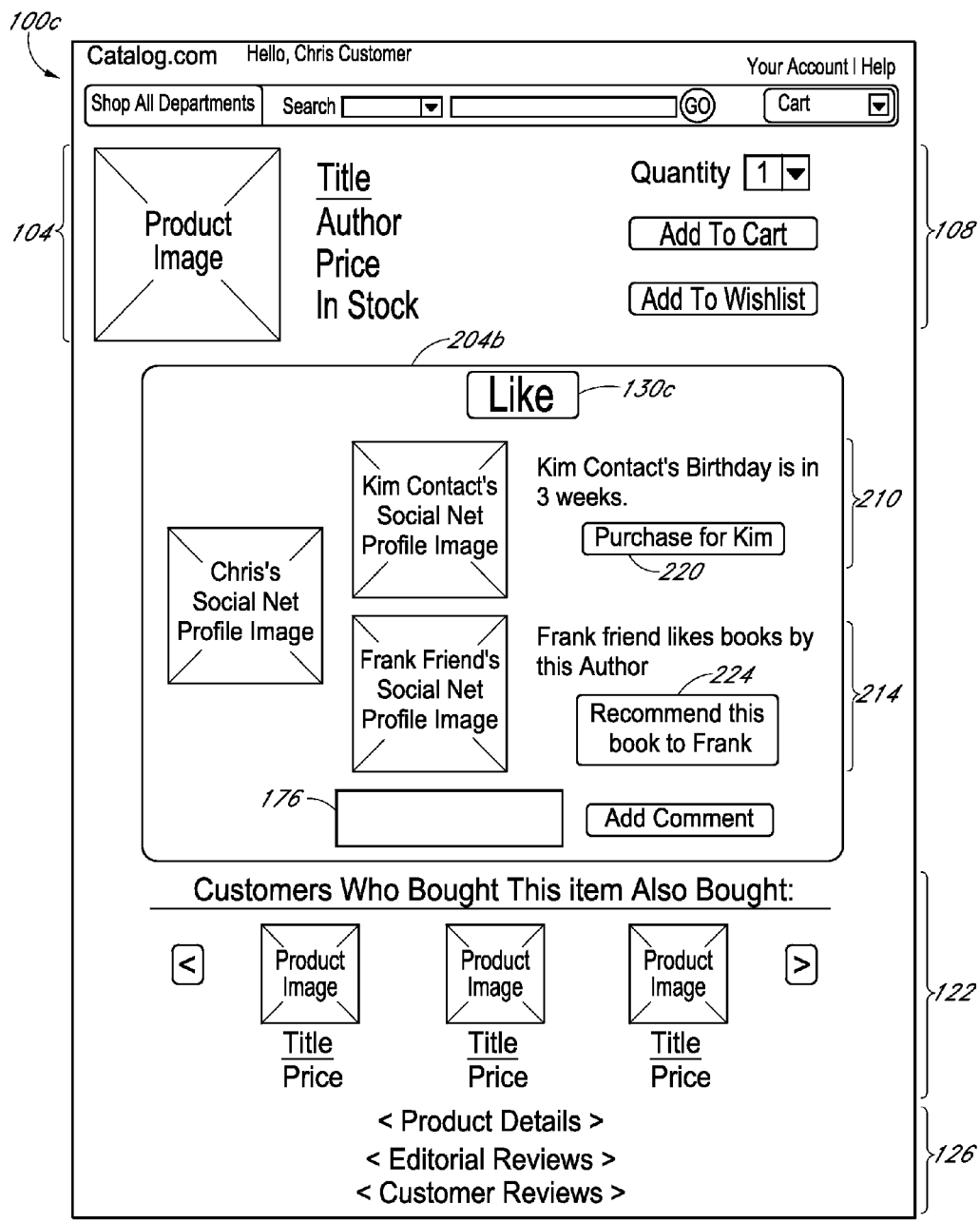

The page customization engines 42 of the personalization service 40 may alter the appearance of the Like button 130 to emphasize the button for customers, for example, who are more active social networking users or who have social networking friends who may be likely to purchase items from the catalog service 30. FIGS. 3A to 3C illustrate example formats of display pages 100a-100c in which factors including, but not limited to, the amount of content, the positioning, the appearance, and the size of the "Like" area are emphasized when compared to the example "default" Like button 130 illustrated in FIG. 2A. FIG. 3A illustrates an example format of a Like button 130a that has been moved from the example default position near the title of the item (see FIG. 2A) to a position in the page feature 108 that allows customers to add one (or more) quantities of the item to an electronic shopping cart or to a wishlist for future purchase. In this example, not only is the overall size (including text size) of the Like button 130a larger than the default Like button 130, but the Like button 130a has assumed a more prominent position on the page 100a, because the button 130a has been placed in a page feature that customers naturally turn to when ordering items. A customer who is likely to purchases the item may also be more likely to click the Like button 130a. The page customization engines 42 may present the Like button 130a to customers the system 30 determines are light-to-moderate users of the social networking system 50, who might appreciate a more prominent appearance of the Like button 130a as compared to the default Like button 130.

FIG. 3B illustrates an example of a page 100b in which the "like" feature is emphasized to a greater degree than the Like buttons 130 and 130a shown in the pages 100 and 100a, respectively. In this example, the "like" feature comprises a Like area 204a that takes up more physical space (e.g., area) on the display page 100b than either of the buttons 130 or 130a on their respective pages 100, 100a. Similarly to the Like button 130a (FIG. 3A), the Like area 204a is positioned in the page feature 108, so that it is readily viewable by customers who are likely to purchase the item. However, in this example, the Like area 204a includes not only a Like button 130b but also includes additional content, e.g., the comment box 176 and the indicator 186 that others in the customer's social network like the item. In other examples, the Like area 204a could include additional or alternative content such as, e.g., the customer's social network profile image.

Due to the larger size of the Like area 204a (compared to the Like buttons 130, 130a), the page presentation engines 42 may choose to resize, rearrange, remove, or substitute other page features to be presented on the page 100b. For example, in FIG. 3B, the page feature 112 (links to other sellers of the product) shown in FIG. 2A has been removed, and the page feature 116 (items frequently bought together) has been "moved up" in the page 100b to be positioned below the page feature 108.

The Like area 204a is more prominently displayed in the page 100b than the Like buttons 130, 130a are in their respective pages 100, 100a. The page customization engines 42 may present the Like area 204a, for example, to customers the system 30 determines are moderate users of the social networking system 50 or moderate influencers of potential selection decisions, as such users may be more likely to appreciate the additional social networking content and functionality of the Like area 204a (as compared to the buttons 130, 130a).

FIG. 3C illustrates an example of a page 100c having a Like area 204b that is emphasized to a greater degree than the Like area 204a shown in FIG. 3B. In this example, the Like area 204b includes Like button 130c, comment box 176, and the customer's social networking profile image. The Like area 204b includes customization areas 210 and 214 that can be used to present further content based at least in part on the customer's social networking information. In this example, the Like area 204b extends across the web page 100c. Due to the larger size of the Like area 204b, the page customization engines 42 have removed the page features 108, 112, and 116 shown in FIG. 2A, and the product details page feature 126 has been "moved up" to be positioned below the Like area 204b.

Continuing with the example described with reference to FIGS. 2A-2H, the catalog system 30 has identified member IDs of two of Chris Customer's friends on the social networking system. The catalog system 30 has used the customer ID-to-Member ID Mappings 44 to determine that one of the member IDs belongs to Kim Contact who is also a customer of the catalog system 30. Because the system 30 knows Kim's customer ID, the system 30 can analyze behavioral data 38 to determine, e.g., Kim's purchasing and item viewing histories. The system 30 also determines that Kim has linked her social networking account and her catalog system account.

The system 30 is unable to personally identify the second member ID (e.g., there is no mapping to customer ID in the database 44 at the present time). This may indicate that the second member is not a customer of the catalog system 30 or has not linked his or her customer account with his or her social networking account. The system 30 determines from Chris's member profile that the second member uses a social networking name "Frank Friend" (which may or may not be this person's real name).

Based at least in part on an analysis of Chris's and Kim's social networking member profile data and customer account and behavioral data 38, the page customization engines 42 customize the customization areas 210 and 214 for Chris. In this illustrative example, the personalization service 40 determines that Kim's birthday is in 3 weeks and that Kim likes the author of the book on the page 100c that is being viewed by Chris. The system 30 also determines from Kim's purchasing history that Kim has not purchased this book. The personalization service 40 customizes the customization area 210 to include Kim's social networking profile image and information about Kim's upcoming birthday. Because Kim has not purchased the book, the personalization service 40 includes a button 220 in the customization area 210 that allows Chris to purchase a copy of the book for Kim for her birthday.

In this example, the catalog system 30 analyzes Chris's profile data and determines that Frank also likes books by the author of the book shown on page 100c. The personalization service 40 customizes the customization area 214 to include Frank's social networking profile image (obtained from Chris's member profile data), and a button 224 that Chris can click to send a recommendation to Frank. If Chris clicks the button 224, the messaging engines 43 of the personalization service 40 can communicate a message to the service interface 58 of the social networking system 50 about Chris's recommendation. The social networking system 50 can post Chris's recommendation on Frank's wall or deliver a private electronic mail message to Frank indicating Chris's recommendation. The post or the electronic mail message may include a link to the catalog system 30 so that Frank can easily order the item, if desired, from the catalog system.

The catalog system 30 can include additional or different customization areas in the Like area 204b (or in other customizable display features). For example, the catalog system 30 may use Chris's social networking and behavioral data to determine recommendations of items for Chris. As an example, the system 30 may determine from Chris's social networking data that Chris likes books by the author "Neal Stephenson" (see, e.g., FIG. 4A) and from Chris's purchasing history that Chris has not purchased the book "Cryptonomicon." The system 30, in this example, may include a customizable area with a recommendation to Chris that he might like "Cryptonomicon."

The page customization engines 42 may present the Like area 204b to customers the system 30 determines are moderate-to-heavy users of the social networking system 50, and who are more likely not only to appreciate the additional social networking content and functionality of the Like area 204b but also more likely to purchase or recommend items to their social networking friends. As will be discussed below, the page customization engines 42 may present the Like area 204b to customers who are significant influencers of potential purchasing decisions made by other users for the item or related items. The page customization engines 42 may also present Like areas similar to area 204b to customers who have social networking friends that are also customers of the catalog system 30 and likely to purchase items from the catalog system. The increased integration of social networking features with catalog system features that is included in the areas 204a, 204b (e.g., the comment box 176 and the customization areas 210, 214) make it relatively easy for such customers to interact with the social networking system 50 and thereby "spread the word" about items to their social networking contacts or to others.

The disclosed systems and methods for customizing the Like button (or other page features) advantageously can increase the likelihood that customers will use such buttons, thereby increasing the amount of item preference information that can be collected for particular customers. Such item preference information can enable the catalog system to provide more reliable item recommendations to customers or to otherwise provide a greater degree of personalization. For example, the customized areas of the display page may include information about items that are popular among the customer's social network contacts.

The Like buttons 130-130c, Like areas 204a, 204b, and customization areas 210 and 214 are merely representative of the format and types of customization and personalization that can be performed by embodiments of the personalization system 40. The Like buttons, areas, and/or other customized areas may be implemented using text other than the term "like" and/or using graphical symbols. For example, the catalog system may display "thumbs up" and "thumbs down" buttons that can be clicked to indicate user like or dislike of an item or may display a rating element that enables users, via a single mouse click, to rate an item on a scale of 1 to 5 stars. The systems and methods disclosed herein can be used to customize or personalize such "thumbs up/thumbs down" buttons or rating element areas of display pages or other types of page features that allow a user to interact with a display page. The systems and methods disclosed herein can be used to customize the "look and feel" of any type of content presented to the user, with the customization based at least in part on the size or activity of the user's social network.

Further, the screen displays shown in FIGS. 2A-3C are merely representative of some of the types of display pages and personalized page features that may be presented to users and customers, and of the format in which such display pages and page features may be presented to users and customers. In other examples, the appearance, size, positioning, content, and so forth of the customizable features of display pages may be different than shown in the illustrative display pages. Also, for privacy reasons, some or all of the types of personalized page features shown in the illustrative display pages may be accessible to a customer only when the customer is logged into the electronic catalog system 30 and has consented to a connection between the customer's catalog system and social networking system accounts.

C. Example Social Networking System Display Pages (FIGS. 4A and 4B)

Figure 4A:
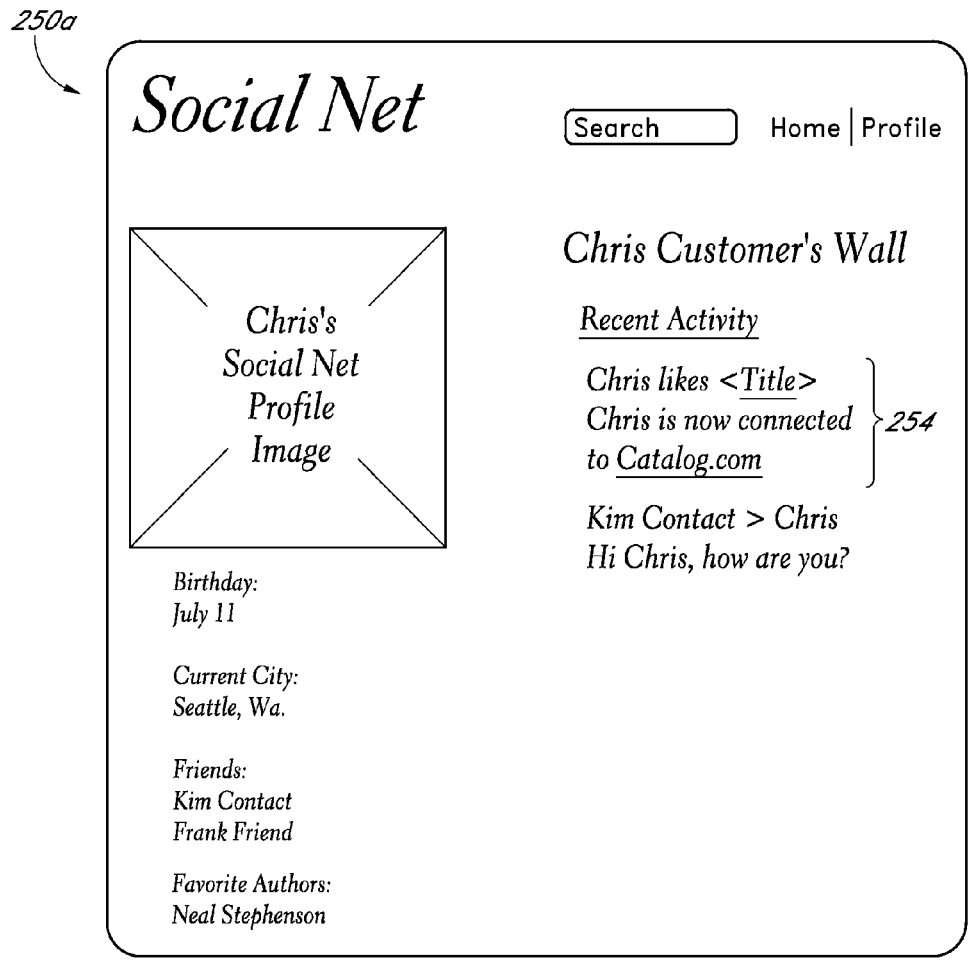
FIGS. 4A and 4B illustrate example formats of web pages that may be generated by the social networking site for a member when the member is also connected to the electronic catalog site.
Figure 4B:
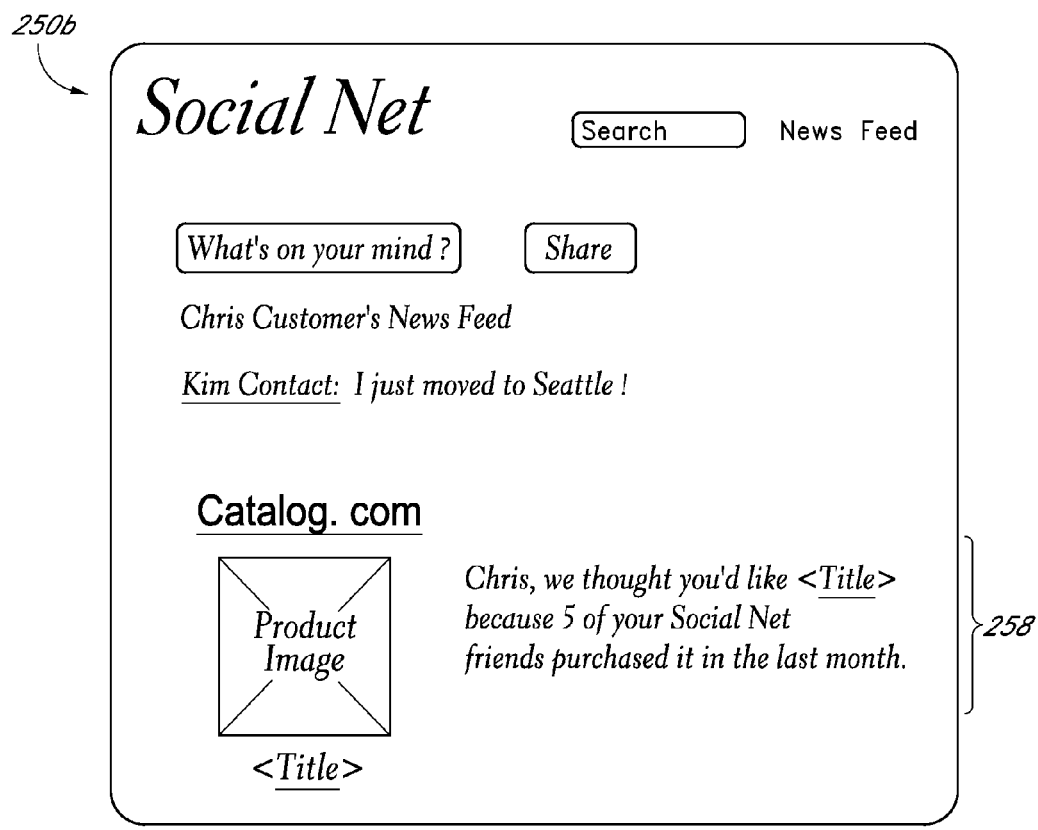

FIGS. 4A and 4B illustrate example formats of web pages that can be generated by the social networking system 50 when a member of the social networking system has connected his or her social networking account and electronic catalog account.

FIG. 4A is an example format of a web page 250a including a "wall" that allows the member and the member's friends or contacts to post content such as comments, photos, videos, etc. In this example, the web page 250a includes Chris's profile image and various fields of profile information for Chris. The web page 250a also includes postings 254 that are presented on Chris's wall. For example, after Chris consented to the connection of his catalog system and social networking system accounts, the messaging engines 43 of the catalog system 30 automatically communicate a message to the social networking system 50 that Chris has made the connection, and the social networking system 50 posts this message to Chris's wall. After Chris clicked the Like button 130 indicating that he liked the item shown on display page 100 (FIG. 2A), the messaging engines 43 communicate a message to the social networking system 50 that Chris likes the item, and the social networking system 50 posts this message to Chris's wall. In addition, the social networking system 50 may include such postings on the news feeds of Chris's friends on the social networking system. The social networking system 50 can use the messages received from the catalog system 30 to update Chris's member profile to include information about these postings (e.g., that Chris likes a particular item).

FIG. 4B is an example format of a display page 250b "news feed" that presents a personalized list of most recent or relevant messages and postings for the member. In some implementations, the social networking system 50 can use a ranking algorithm to determine which posts will appear on each member's news feed. For example, the ranking of a post or message sent from one member or contact to another member may be based at least in part on (1) how often the members or contacts interact on the social networking system, (2) how many comments and "likes" the post or message has received, and (3) how old the post or message is. The news feed of each member can be continuously updated by the social networking system 50 based on the current rank of posts and messages to the member.

As will be discussed with reference to FIG. 6, the catalog system 30 can analyze the social networking information retrieved from the social networking system to determine whether and how often to communicate customized messages about items and services available on the catalog system 30 to selected members of the social networking system. In the example news feed shown in FIG. 4B, the catalog system 30 has analyzed the social networking information and customer behavioral data and has determined that several of Chris's friends on the social networking system recently purchased an item. The catalog system 30 also has determined that Chris had not purchased the item from the catalog system 30. Based (at least in part) on this analysis, the messaging engines 43 have communicated a personalized message to Chris about the item. The social networking system 50 has received the message from the catalog system 30 and has posted the message 258 to Chris's news feed (FIG. 4B). The message 250 can include hyperlinks that can be clicked by Chris to directly access the item page on the catalog system 30. For example, in the message 258, the title of the item and the product image may be hyperlinks.

In other examples, the message from the catalog system 30 may be a personal message communicated directly to a member that the social networking system 50 posts to a personal (private) message area of the social networking system rather than to a publicly viewable area such as the news feed. In still other examples, the message from the catalog system 30 may be an electronic mail message communicated to a member's electronic mail account.

Although the example screen displays shown in FIGS. 2A to 4B depict web pages displayed by a web browser, other types of user interfaces may be used to view the display pages. For example, the personalized content may be presented via a user interface of a proprietary mobile phone or electronic book reader application that makes page requests over a network to the personalization service 40.

III. PROCESSES FOR GENERATING SOCIAL NETWORKING PROFILE-BASED CONTENT

Figure 5:
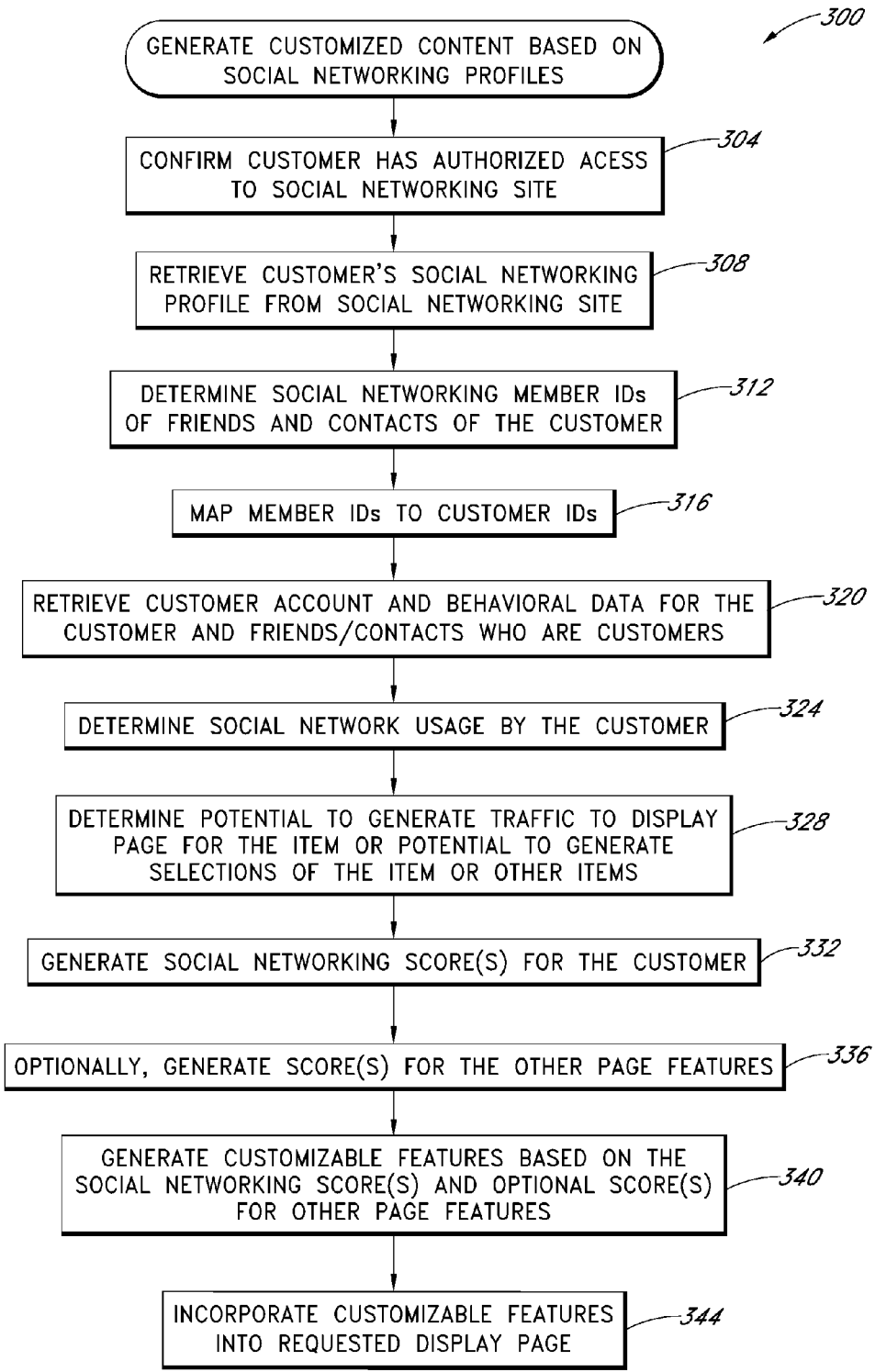
FIG. 5 illustrates an embodiment of a process for customizing content (e.g., for display pages) based on social networking profile information.

FIG. 5 illustrates an embodiment of a process 300 for generating customized content using social networking profiles. The process 300 may be executed by the personalization service 40 (e.g., page customization engines 42) of the catalog system 30 to generate personalized display pages that are presented to a user or customer when a user computing device 34 requests a page from the catalog system 30 (e.g., an item detail page). The process 300 can be used to generate web pages such as, e.g., those illustrated in FIGS. 2A-3C.

At block 304, the process 300 determines whether a customer has authorized a connection between the customer's catalog system account and social networking system account. If the customer has not provided the authorization, the process 300 ends, which protects the privacy of the customer's social networking information. If the customer has provided authorization, the process 300 continues at block 308 where the personalization service 40 retrieves the customer's social networking member profile from the social networking system 50. At block 312, the personalization service 40 analyzes the customer's member profile to determine the member IDs of the customer's friends and contacts in the customer's social network. The group of friends and contacts identified by member ID will be referred to below as the customer's "social network contacts."

At block 316, the personalization service 40 uses the customer ID-to-member ID mappings stored in the repository 44 to determine whether any of the social network contacts identified at block 312 correspond to customers of the catalog system 30. Member IDs that can be mapped to a customer ID will be referred to below as "friend customers," because the social network contact is both a friend of the customer and a customer of the catalog system 30. Member IDs that cannot be mapped to a customer ID will be referred to below as "unknown friends," because although the social network contact is a friend of the customer, the social network contact cannot be identified as a customer and is (effectively) unknown to the catalog system 30. In some cases, unknown friends may be customers of the catalog system 30 who have not consented to linkage between their social networking and catalog accounts.

If the catalog system 30 determines that a mapping between customer ID and member ID is not already stored in the repository 44, the system 30 may add this new mapping to the repository so that the catalog system 30 can build up an up-to-date database linking social networking system members and catalog system customers.

In some embodiments of the process 300, the personalization service 40 may repeat blocks 304 to 316 for the friend customers identified at block 316 to generate a more detailed picture of the customer's social network. Accordingly, in various embodiments, the blocks 304 to 316 may be performed once to obtain the customer's social network out to the friend level, twice to obtain the customer's social network out to the friend-of-friend level, and so forth. The retrieved social networking profile information can be stored in the cache 48 to reduce the need for future retrievals of social networking information for the social network contacts of the customer.

At block 320, the personalization service 40 retrieves from the repository 38 customer account data and behavioral data (e.g., purchase histories, search histories, item viewing histories, etc.) for the customer and the friend customers. As discussed above, the catalog system 30 may not have customer or behavioral information for the unknown customers or may not be able to map the unknown customers because they have not linked their social networking accounts to their catalog system accounts. In some embodiments, the system 30 attempts to find a match between an unknown customer and a current customer based on similarities between the profiles of an unknown customer and the matched customer. For example, the system 30 may attempt to match demographic profiles (e.g., age, gender, geographical location), likes and preferences for items, authors, artists, organizations, hobbies, etc. The personalization service 40 may use the behavioral data for the "matched customer" as a proxy for the behavioral data for the unknown customer.

In some embodiments of the process 300, the blocks 304 to 320 are repeated for each social networking system to which the customer has linked his or her catalog system account.

At block 324, the personalization service 40 determines the social network usage by the customer. For example, the usage may be based at least in part on some or all of the following factors: (1) the number of social network contacts, (2) the number of friend customers, (3) the number of unknown customers, (4) the amount of interaction on the social networking system between the customer and the social contacts, and (5) the amount of recent activity by the customer on the social networking system. The usage may comprise a weighted combination of these factors (or additional or different factors).

Social network usage may also include a customer's ability to influence others with respect to items available from the catalog system 30. For example, the system 30 may determine whether a customer is an actual or potential "influencer" with respect to one or more items. Influencers may, but need not, have a relatively large social network and/or may, but need not, be heavy users of social networking sites. Influencers can act as promoters or advocates by raising awareness of items among various communities or social networks. For example, an influencer may be a writer, reviewer, blogger, commentator, or celebrity whose writings or postings are followed by others or are relatively widely disseminated. Influencers may shape future buying decisions by others and may be trendsetters or early adopters who can increase the perceived need for items or categories of items by others. Influencers may be influential with respect to one or a few items (or categories of items) or may be influential with respect to broad classes or genres. For example, a customer who is an online reviewer of rap music may be an influencer for the category of rap music but may have little or no influence with respect to other categories of music (e.g., rock, classical, or jazz) or other item categories (e.g., books, movies, fashion, etc.).

In various embodiments, the system 30 determines social network usage by including (additionally or alternatively to the above factors) a customer's influence based at least in part on one or more of the following factors: (1) the number of times a customer posts information about or comments on an item or group of items, (2) whether the customer is among the first in his or her social network to post information about or comment on item(s), (3) whether others have indicated that they have found a posting or comment by the customer to be helpful, (4) interaction among the customer's social network contacts with respect to the customer's post or comment related to an item, (5) the amount of traffic to a detail page for the item that is generated by customer views of postings or comments by the influencer, and (6) the number or cash value of or revenue generated by selections of the item based on the web traffic in factor (5). As an example of factor (4), the catalog system 30 may analyze the social network data and/or customer behavioral data to determine the number of times a customer's comment or post about an item has been liked or commented on by others. As an example of factors (5), the catalog system 30 may analyze the social network data and/or customer behavioral data to determine the number of times customers have clicked a link to the detail page in a posting or comment by the influencer. As an example of (6), the catalog system 30 may use the social network data and/or customer behavioral data and the information from factor (5) to determine how many customers selected the item for, e.g., purchase, rental, etc.

At block 328, the personalization service 40 determines the potential of the customer's social network usage to drive traffic to a display page for an item or to generate selections of the item or other items from the catalog system 30. For example, the potential may also reflect potential for selections of items that may be frequently purchased together with the item or that may be marketed together with the item by the catalog system 30 (e.g., extended product warranties for the item, a paid membership program that provides additional customer benefits such as, e.g., low (or no) cost or expedited shipping, etc.). Since the potential for traffic to or selections from the catalog system may be more likely for those users with accounts on the system, the potential may be determined by weighting information about friend customers more than information about unknown customers (whose profile has not been matched to a profile of a current customer). For example, the potential for traffic or selections may be based at least in part on some or all of the following factors: (1) the number of friend customers (e.g., relative to the total number of social contacts), (2) the number of unknown customers whose profile has been matched to a current customer, and (3) behavioral histories of the friend customers or matched customers. The behavioral histories (from repository 38) can be used to identify to friend customers (or matched customers) who frequently select (or have recently selected) items from the catalog system 30 or who have frequently (or recently) clicked the Like button. Such customers tend to have more potential to visit, select from, or indicate likes and preferences from the catalog web system. Customers who have a tendency to indicate their likes and preferences for items generally will drive more traffic (and potential sales) to the system, because their likes and preferences can be communicated to their friends on the social networking system (e.g., such customers may be influencers for particular types of items). Thus, the likes and preferences of these customers may have more potential to "spread the word" about items and services, which can lead to further web traffic, sales, and new customers for the catalog system 30.

For particular classes or genres of items (e.g., books, music, video, etc.), the system 30 may analyze the behavioral data to determine the potential of friends or matched customers to buy items in that class or genre. For example, a customer who frequently buys books but only infrequently buys music may be given more potential when the requested item detail page is for a book than when the requested item detail page is for music.

At block 332, the process 300 generates one or more "social networking scores" for the customer based at least in part on the analysis performed at blocks 324 (e.g., social networking usage) and 328 (e.g., potential for traffic or selections of the item or other items). For example, the social networking score will tend to be higher for customers having a greater amount of social networking usage or having a greater potential to direct traffic to or generate selections from the catalog system 30. In some embodiments, the social networking score is a weighted combination (e.g., weighted average) of one or more of the factors determined at blocks 324 and 328. As one example, a customer may have a large and active social network (e.g., having a relatively large number of social network contacts who frequently interact). This factor would tend to increase the social network score for the customer. However, if relatively few of the social network contacts are current or potential customers or likely to visit the catalog system, the overall social networking score generated this customer may be relatively low. As another example, a customer may have a relatively small social network (e.g., having a relatively small number of social network contacts) but a relatively high percentage of these social network contacts are current customers who frequently purchase items from the catalog system. The overall social networking score for this customer may be relatively high (e.g., higher than the overall score for the customer in the first example).

In some implementations, the system 30 may generate multiple scores, with different scores generated for different customizable features that can be included in the display page. The different types of customizable features may depend on the item (or type of item) and/or events that may occur in the customer's social network. Continuing with the illustrative example of Chris Carpenter, assume that his friend Kim Contact's birthday is in 3 weeks. The process 300 may generate a score for the customizable feature 210 illustrated in FIG. 3C, which includes a notification to Chris about Kim's upcoming birthday and a button 220 allowing Chris to purchase an item for Kim. The process 300 may generate a score for other possible customizable features. For example, the feature may include a notification about Kim's upcoming birthday and information about one or more related items (e.g., an item frequently purchased with the item, an extended warranty, a paid membership program, etc.). The scores may depend (at least partially) on the time before an event occurs. For example, the scores discussed above for page features related to Kim's birthday may depend on whether Kim's birthday is several weeks, several days, or one day in the future. As will be discussed with reference to block 340, the social networking score(s) can be used by the page customization engines 42 to customize the appearance, size, positioning, and prominence of the Like button 130 (or Like area 204) for the customer.

At optional block 336, the catalog system 30 may establish scores (or rankings) for some or all of the other features that can be presented on display pages (see, for example, the page features 104-126 illustrated in FIG. 2A). The catalog system 30 may establish a score for the feature based at least in part on one or more factors including: (1) the importance of the feature to the display page, (2) customer expectations that the feature will be present on the page or have a particular appearance or position on the page, (3) actual or potential revenue generated by the feature if the feature appears on the page, and (4) actual or potential lost revenue if the feature does not appear (or is deemphasized) on the page. For example, the item image and description in the page feature 104 and the item ordering functionality in the page feature 108 are very important to a detail page describing the item. Also, customer expectations about the "look and feel" of the catalog system's web pages may indicate that the page features 104 and 108 should be near the top of the page and on the left and right, respectively. Such page features may have relatively high scores (or rankings). Other features may be less important to certain display pages and their appearance, size, positioning, etc. on the page may be measured by a score determined by comparing, for example, the amount of revenue (actual or potential) that may be generated by their appearance or the amount of revenue (actual or potential) that may be lost if they do not appear (or appear less prominently).

At block 340, the page customization engines 42 of the personalization service 40 can generate one or more customizable features of a display page based at least in part on the social networking score(s) determined at block 332. In some embodiments, the higher the social networking score(s), the higher the degree of customization, and, conversely, the lower the social networking score(s), the lower the degree of customization. For example, for customers with relatively low social networking scores (e.g., light users of the social networking system), the personalization service 40 may generate a display page that includes the "default" Like button (see, the example illustrated in FIG. 2A). For customers with higher social networking scores (e.g., moderate users of the social networking system), the personalization service 40 may emphasize the appearance (and/or content) of the Like button as illustrated, for example, in FIG. 3A or 3B (e.g., the Like area 204a). For customers with even higher social networking scores (e.g., heavy users of the social networking system or users with significant influence), the personalization service 40 may emphasize the appearance and content to an even greater degree and include a prominent Like area 204b as illustrated, for example, in FIG. 3C.

In some embodiments, the personalization service 40 may compare one or more of a customer's social networking scores to one or more thresholds to determine the degree of customization to be presented to the customer or to determine which customizable features to include in the display page. As one example, the catalog system 30 may set thresholds that correspond to light, moderate, and heavy social networking usage and provide increasing amounts of customization if the customer's social networking score equals or exceeds a corresponding threshold. As another example, the catalog system 30 may rank scores for different page features and include one or more of the page features if their respective scores exceed one or more thresholds. In some such embodiments, one or more of the thresholds can be predetermined, and in other embodiments, one or more of the thresholds can by adjusted or changed by the personalization service 40 as the catalog system gathers information about customer usage of the "like" functionality or effectiveness of the like functionality to generate traffic to or selections from the catalog system 30.

The personalization service 40 may use the social networking score for applications. For example, if a customer is very active on the catalog system or the social networking system, or has a relatively large social network (e.g., is a moderate or heavy social networking user), or is a significant influencer of other users' behaviors (e.g., is an influencer), the catalog system 30 may prompt the customer to post reviews or ratings of items on the catalog system or social networking system. In some embodiments, the catalog system may give the customer an incentive to make such postings, e.g., by compensating the customer when the customer's social networking contacts make purchases from the catalog system.

Although some of the above examples are described in terms of three levels of customization (e.g., light, moderate, and heavy social networking or influence), this is not intended to be a limitation, and in other examples, any suitable amount or degree of customization can be provided by the personalization service.

As discussed above with reference to optional block 336, some implementations of the catalog system 30 generate scores for other features that can be presented on a display page. In some such implementations, the personalization service 40 may compare the customer's social networking score to scores for other page features to determine the extent of the customization of the respective features. For example, the Like area 204b in the example shown in FIG. 3C is significantly larger than the default Like button 130 shown in FIG. 2A and replaces the page features 108, 112, and 116 shown in FIG. 2A. Although there may be a benefit to including a larger or more prominent Like area (e.g., greater traffic and potential sales), in some cases there may be a cost associated with removing or deemphasizing other page features. For example, by removing (or deemphasizing) the "Frequently Bought Together" page feature 116, the catalog system 30 may lose revenue on convoyed sales of related items. Therefore, certain embodiments of the personalization service 40 can use the scores of respective page features to determine whether the benefit of adding or emphasizing the appearance of one page feature outweighs the cost of removing or deemphasizing another page feature. For example, the personalization service 40 may use the scores to rank the features to be incorporated into a page requested by a user/customer, with the top ranked features (e.g., the top 10 features) being presented to the user/customer.

At block 344, the page customization engines 42 incorporate the top-ranked page features into a display page, which may be presented to the user/customer via the web servers 32 using one or more page templates from the repository 33.

IV. PROCESSES FOR GENERATING SOCIAL NETWORKING PROFILE-BASED MESSAGES

As described above, the electronic catalog system 30 may implement functionality that allows a customer to "like" an item described on a display page, e.g., by clicking a Like button. When a customer clicks the Like button, information about the display page (e.g., information about the item, product images, product reviews, hyperlinks to the catalog page for the item, etc.) is communicated to the social networking system 50 and incorporated into the customer's member profile. The customer's member profile can be updated to include a connection reflecting that the customer "liked" the item presented on the display page. For example, display pages may include metadata that allows various aspects of the display page to be represented in the member profiles of the social networking system 50 (e.g., descriptions, images, etc.). In some embodiments, display pages may utilize the Open Graph protocol (available from opengraphprotocol.org) to permit integration of the display page into the "social graph" of the social networking system 50. The social networking system 50 can integrate this "like" information into member profile pages, postings on member news feeds, and results for searches performed on the social networking system.

Other members of the social networking system 50 who view a posting or news feed about a customer's "like" of an item can also indicate that they too "like" the item (e.g., by clicking a button with "like" functionality provided by the social networking system). The "likes" of all these members can be incorporated into the social graph of the social networking system through updates of corresponding member profiles. In certain implementations, the social networking system 50 can provide functionality for administrators of a display page to obtain statistics and detailed analytics about members who liked the display page. The social networking system 50 may also enable display page administrators to communicate messages to some or all of the members who have liked the display page.

The electronic catalog system 30 can analyze member profile information obtained from the social networking system 50 to determine, for example, the content or timing of marketing or informational messages communicated from the catalog system 30 to users of the social networking system 50. For example, the catalog system 30 may determine which social network members liked an item available from the electronic catalog, and direct messages to some or all of those members. The messages may be preferentially sent to social network members who are current or potential customers of the catalog system 30. Certain embodiments of the catalog system 30 utilize the personalization service 40 and the messaging engines 43 to communicate customized or personalized messages to the social network members.

A. Examples of Events that May Trigger Messaging

The electronic catalog system 30 may monitor events that are associated with some or all items or services offered by the catalog system 30, and after occurrence of such event(s), may determine that a message about the event(s) should be communicated to customers of the catalog system 30 or members of the social networking system 50 who have indicated they like the item.

Events associated with items ("item events") can include, but are not limited to: (1) new user activity on a detail page for the item, (2) a price change for the item, (3) a new merchant offering for the item that is different from current offerings, (4) new versions or editions of the item, (5) new products/services from the provider of the item, and (6) new products/services related to the item. There can be multiple events for any item, and some types of events may be classifiable in more than one of the example categories (1)-(6).

Examples of (1) include new images of the item posted by customers, new reviews of the item (text reviews or video reviews), comments on reviews or indications that the reviews were helpful, new tags (e.g., keywords or category labels) for the item, changes in sales rank, page viewings, or the number of likes for the item (e.g., a rise in popularity of the item). Examples of (1) can also include an indication that quantity of the item available from a merchant is decreasing (e.g., the item is running out of stock). Examples of (3) include merchant promotions for the item (e.g., a holiday promotion or special deal). Examples of (5) include, for a book or movie, a new book by the book author or a new movie by the movie director or movie star. Examples of (6) include new products that are often viewed or purchased by customers after viewing or purchasing the item. Examples of (6) also include any type of event that occurs for the related product (e.g., a significant price drop for a product that is often purchased with the item).

In some implementations, item events may be ranked by a precedence factor that is indicative of the event's potential relevance to customers or social network members. For example, a 20% price drop for an item may be ranked higher than a 5% price drop. A video review posted for an item may be ranked higher than a text review of the item. An upcoming release of a new book by an author may be ranked higher than the release of a new edition of an old book by the author. The catalog system 30 may maintain a list of item events, with the list sorted by precedence factor. As will be described below, the precedence factor (among other things) may be used to determine the content of the message (e.g., which events to include in the message), when (and via what channel) to send the message, and to whom the message should be sent.

B. Examples of Scoring Methods for Events and Items

As described above, the catalog system 30 can determine a list of item events associated with items in the electronic catalog. The catalog system 30 can use social networking information and customer behavioral information to determine a set of customers and social networking members who may receive a message about the event. For example, the catalog system 30 can generate a score that reflects the potential of a message with information about the item event to drive traffic to a detail page for the item or to generate selections of the item (e.g., page views, searches, purchases, downloads, rentals, likes, additions to wishlists, etc.). In some embodiments, the score can be based at least in part on factors such as, e.g., (1) the number of social networking system members that have "liked" the item, (2) the number of the members determined in (1) who are also customers of the catalog system, and (3) behavioral information (e.g., purchasing and viewing histories) of the customers determined in (2).

The catalog system 30 can obtain information about factor (1) from the social networking system 50 (e.g., via API calls requesting statistical or analytical data) or by analyzing member profiles received from the social networking system 50. Such information can include member IDs of the social networking members who have "liked" the item. The catalog system 30 can use the customer ID-to-member ID mappings from the repository 44 to determine which of the social networking members are also customers of the catalog system 30, e.g., to determine factor (2). For factor (3), the catalog system 30 can use behavioral data from the repository 38 to determine item selection histories and "like" histories for the customers. In some embodiments, the catalog system may use factors (2) and (3) to determine additional factor(s) indicative of how often and to what extent customers interact with the catalog system. For example, the system 30 may determine whether a customer is a frequent or infrequent buyer of products similar to the item (e.g., a frequent buyer of books, if the item is a book) or whether a customer is likely to write product reviews, comment on or like the item, etc.

The catalog system 30 may combine factors such as those described above to generate the score for an item event. The various factors may be weighted to reflect their relative importance in determining the potential for traffic or sales. The score for a message about an item event will generally be higher if there are a relatively large number of social networking members who liked the item and if a relatively high percentage of those members are frequent buyers of products from the catalog system. As described above, the catalog system 30 may generate a precedence factor for different types of events that are associated with an item (e.g., a 20% price drop has more precedence than a 5% price drop). In some embodiments, the score is also based on the precedence factor, with the score being higher for item events having more precedence or relevance to a member or customer.

The score can be used (at least partially) to select social networking members (or catalog system customers) to whom to send a message. As one example, suppose the item event is a significant price drop for a book (e.g., "Harry Potter and the Deathly Hallows"). The analysis of the social networking and behavioral information may show that, for example, there are a large number of social networking members who like the works by the author (J. K. Rowling) of this book. The analysis may also show that, e.g., 40% of the members are also catalog system customers, and of those customers, 20% have already purchased the Harry Potter book. In this example, the score for the price drop on the Harry Potter book may be relatively high for several reasons. First, since there are a large number of social networking members who like the author's works and only 40% of them can be identified as current customers of the catalog system, there are a large number of potential customers who might be interested in learning about a price drop for the book (e.g., the 60% of members who cannot be identified as catalog system customers). A message to those members with information about the price drop may lead to significant traffic to the catalog system detail page for the Harry Potter book and numerous orders for the book. Second, analysis of the customer behavioral data indicates that only 20% of the customers who like the author have purchased the Harry Potter book. The catalog system 30 may send a message to the remaining 80% of customers who have not purchased the book (according to catalog system purchasing histories) with information about the price drop, because this message may also generate web traffic and potential sales.

Continuing with this illustrative example, suppose there is a second event associated with the book, for example, a new book by an author of books that are frequently bought together with the Harry Potter book (e.g., the book "The Lost Symbol" by Dan Brown). Because the Lost Symbol book is a related product, the catalog system 30 may assign a lower precedence factor, and score, to the publication of The Lost Symbol than to the price drop on the Harry Potter book. However, for the 20% of customers who have already purchased the Harry Potter book, the price drop, in some cases, may be assigned a relatively low precedence factor, and, for these customers, the score for the publication of The Lost Symbol may be higher than the score for the price drop on the Harry Potter book. Therefore, for these customers, the catalog system 30 may send a message about the publication of the Lost Symbol rather than a message about the price drop on the Harry Potter book. In other cases, the catalog system 30 may determine that the price drop has relevance to customers who have already purchased the Harry Potter book, because the system 30 determine that some or all of these customers frequently purchase books for friends in their social network. The catalog system 30 may also sent a message about the publication of The Lost Symbol to members and customers who were earlier sent the Harry Potter message. As will be further described below, to increase the effectiveness of the Lost Symbol message, the catalog system 30 may send the message following a delay period (e.g., 3 hours, 1 day, 1 week) after the time the Harry Potter message was sent, so that members and customers are more likely to view and respond to the second message (e.g., rather than ignoring or deleting it).

C. Examples of Item, Event, and Relevance Filtering

The electronic catalog of the catalog system 30 may include millions or tens of millions of items, which may make it impractical to monitor each item for events associated with the item. In some embodiments, the catalog system 30 may monitor events only for a subset of all the items offered in the electronic catalog. For example, the catalog system 30 may determine the number of "likes" for items in the electronic catalog, and generate the subset as those items for which the number of likes exceeds a threshold (e.g., the top $10^5$ liked items). The number of likes for items can be updated hourly, daily, weekly, etc., and the threshold may be item-dependent (e.g., different thresholds for books than for videos). Additionally or alternatively to counting the number of times an item is liked, the catalog system 30 may count the number of times the Like button is presented for that item, which can allow the system to determine the ratio of Like-button selections to Like-button presentations. The subset of items may include items in which this ratio is relatively large (e.g., above a threshold), because these items effectively engage users or customers who are more likely to interact with the item detail page (e.g., by selecting the Like button).

A number of events may be found to be associated with any particular item, for example, a price drop, a video review of the item on the catalog system, a member comment about the item on the social networking system, and a vendor promotion (e.g., a special holiday deal). The catalog system 30 may filter the item events associated with the items being monitored to determine which events may be most relevant to members or customer or which events may be more likely to lead to web traffic and sales of the item. As described above, the item events may be filtered based on one or more precedence factors for the events (e.g., a 20% price drop has more precedence than a 5% price drop). For example, the catalog system 30 may rank events based on the precedence factors such that, for a social networking member or catalog system customer, the highest ranked event is likely to be the most relevant for that member or customer. As one example, a price drop event may be ranked more highly for a customer who has not purchased the item than for a customer who has already purchased the item. Messages to the members and customers may include, for example, some or all of the most highly ranked events so that the member or customer is likely to find the message useful and informative.

As many social networking members and catalog system customers may have many items that they like, the catalog system 30 may determine a list of multiple messages to send to each member or customer. For example, a member may have indicated he or she likes twenty five items, and the catalog service 30 may have identified events for ten of those items. If the catalog service 30 were to send to the member ten messages about these item events, the member may find receipt of these ten messages (which could fill up the member's news feed for a period of time) more of a distraction than helpful information about an item they like. Therefore, the catalog system 30 may filter the messages so that (1) only some of the messages are sent (e.g., the messages with the highest scores or precedence for the member), (2) combine some or all of the item events into one message or a small number of messages, (3) stagger the delivery of some or all of the messages over a time period selected so that the member has a reasonable time to view and respond to each message before the next message arrives, (4) send some different messages via different messaging channels (e.g., news feed, personal electronic mail, text or video message to a mobile phone, e-book reader, or to a shopping application on such devices, etc.), or a combination of the foregoing.

As an example of (1), the catalog system 30 may send only those messages that have a score that exceeds a threshold. The threshold may depend on the type of item (e.g., book or movie) or the nature of item event. As an example of (3), items posted to a news feed generally appear in the news feed for a time period before they are replaced by new items. This time period may be about three to six hours for some social networking systems. The catalog system 30 may stagger messages to a member so that at any time only one message from the catalog system is likely to be present in the member's news feed.

D. Examples of Customization of Message Content

The personalization service 40 of the catalog system 30 can customize the content of the message based on, e.g., the score for the message and precedence values for various item events. Messages may include information about the item event, an image of the item, a text or video review of the item posted by a customer or social networking member, a sample of a portion of a book, music, or video clip, and so forth. When there is more than one event for an item, the personalization service 40 may rank the events by precedence and include information only about events that have a sufficient precedence value (e.g., to reduce the likelihood of saturating the recipient with too much information). As an example, if there is a significant vendor promotion on the item and a new text review of the item, the system 30 may determine that the vendor promotion is likely to be more relevant to potential customers than the text review, and include only the vendor promotion in the message.

As described below, the catalog system 30 can use member and customer feedback about the effectiveness of the messaging to determine content for future messages. For example, the feedback may indicate that messages that include a video review of an item are more effective at driving traffic and sales than messages that include a text review of the item. The personalization service 40 can use this feedback to preferentially include video reviews in future messages.

E. Examples of Member and Customer Feedback

The catalog system 30 may monitor the effectiveness of the messaging to determine, for example, whether a particular message led to increased web traffic or increased sales. The system 30 can determine this effectiveness by analyzing the social networking member profile information (e.g., from repository 48) and the customer behavioral data (e.g., from repository 38). As one example, when a customer views an item detail page or purchases an item from the catalog system 30, the system 30 can map the customer ID to a member ID to determine whether a message about the item had been recently sent to the customer's social networking account. The system 30 can also whether the item detail page was accessed by clicking on a link provided in the message. The system 30 may also monitor whether the message engaged social networking members who may have viewed the message in their news feed. For example, the system 30 may analyze the social networking member profile data to determine the number of members who commented on or liked the message.

In some implementations, the catalog system 30 can use the results of this monitoring to increase the effectiveness of the messaging and lead to increased web traffic and sales. For example, precedence factors, weights, filter parameters, and so forth can be changed or adjusted based on this customer or member "feedback" so that message scores and rankings better represent the effectiveness and engagement of the messaging. The feedback information can also be used to better select content of the message, timing of the delivery of messages, and channels for message delivery so that members find the messages to be useful at providing information about items they like. For example, if member and customer feedback indicates that a message with a new text review of an item leads to relatively little new traffic or sales, the weights and precedence values for text reviews can be reduced relative to other item events.

F. Example Method for Customized Messaging

Figure 6:
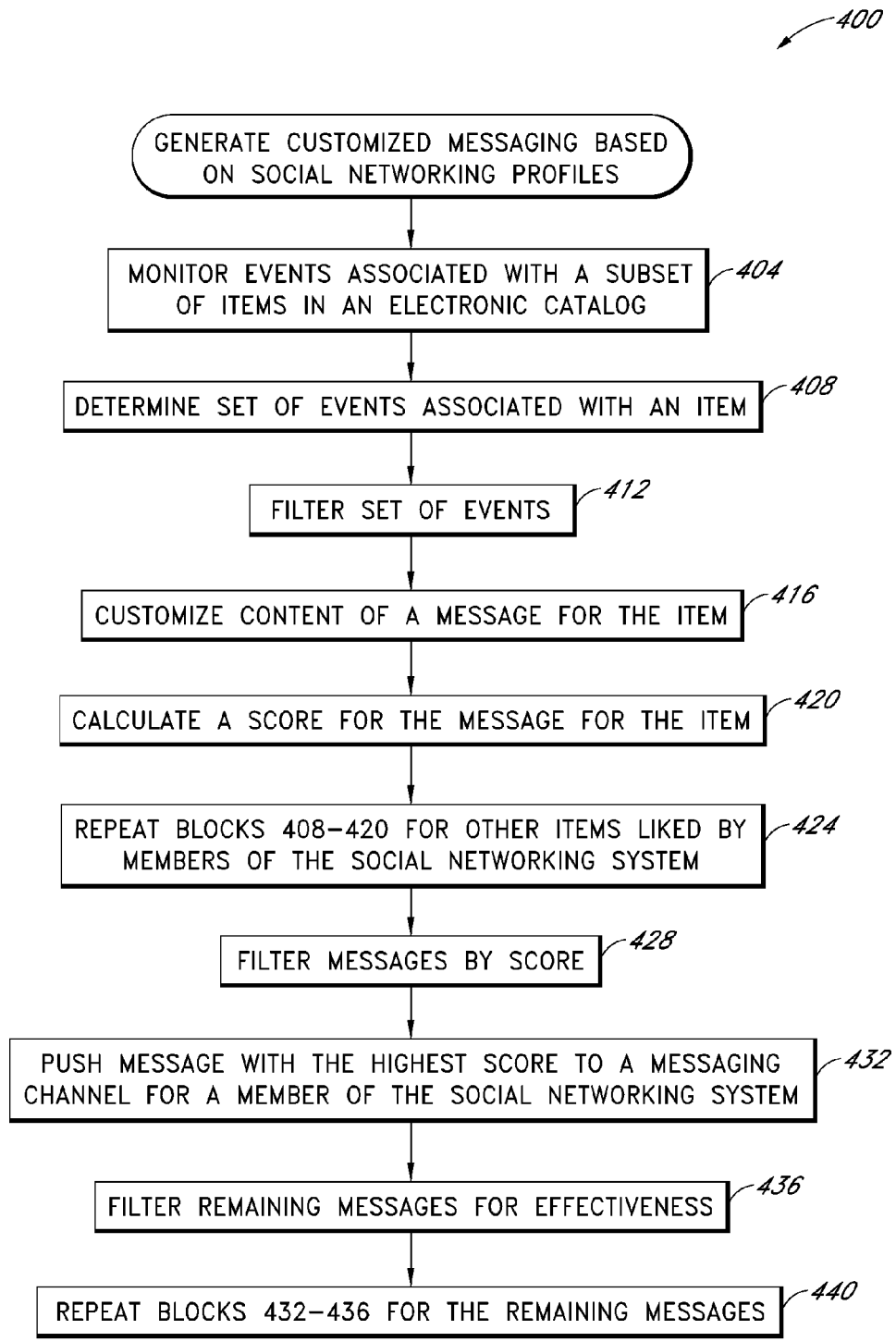
FIG. 6 illustrates an embodiment of a process for customizing messages based on social networking profile information.

FIG. 6 illustrates an example embodiment of a process 400 for generating messages based on social networking member profile data. In some implementations of the catalog system 30, the example process 400 is performed by the personalization service 40. FIG. 6 is intended to illustrate various aspects of the messaging process; however, in other embodiments, the process for customizing and communicating messages may be performed differently than shown in FIG. 6.

At block 404, the process 400 monitors events associated with items available from an electronic catalog. As described above, the catalog system 30 may monitor events only for a subset of all the items offered in the electronic catalog. For example, the catalog system 30 may determine the number of "likes" for items in the electronic catalog, and generate the subset as those items for which the number of likes exceeds a threshold (e.g., the top $10^5$ liked items). The number of likes for items can be updated hourly, daily, weekly, etc., and the threshold may be item-dependent (e.g., different thresholds for books than for videos).

At block 408, the process 400 determines a set of events that are associated with a particular item. For example, there may be a price drop on the item, a newly uploaded video review of the item by a customer, a special promotion by a vendor, and a price drop on a product that is frequently purchased with the item. At block 412, the process 400 filters the set of events associated with the item. For example, the process 400 may assign precedence values to each event and rank the events according to their precedence. As an example, the precedence of a price drop for a customer who has not purchased the item may be relatively high whereas the precedence of the price drop may be relatively low for a customer who has already purchased the item. The filtering may improve the likelihood that messages about item events that are relevant and interesting to a particular member or customer are communicated to that customer and messages about item events having little relevance are not communicated.

At block 416, the process 400 customizes the content of a message for the item. The process 400 may include in the message information about only the most relevant events identified at block 408. As described above, member and customer feedback information can be used to identify the type of content that is most effective at driving traffic and item selections, and the process 400 can incorporate the most effective type(s) of content into the message.

At block 420, the process 400 can use social networking information and customer behavioral information to generate a score that reflects the potential of a message to drive traffic to a detail page for the item or to generate purchases of the item. The score can be based at least in part on a combination of factors such as, e.g., (1) the number of social networking system members that have "liked" the item, (2) the number of the members determined in (1) who are also customers of the catalog system, and (3) behavioral information (e.g., purchasing and viewing histories) of the customers determined in (2). The various factors may be weighted to reflect their relative importance in determining the potential of the message for traffic or sales.

At block 424, the process 400 repeats the blocks 408 to 420 for other items that have been liked by members of the social networking system 50 or customers of the catalog system 30. The result of this block is a determination of a set of potential messages (and their associated scores) for events associated with items like by social networking members or catalog system customers. In subsequent blocks, the process 400 can determine which of these potential messages to send, which members or customers to sent them to, and when to send them.

At block 428, the process 400 filters the potential messages found at block 424 by their respective scores. For example, the filtering may rank the messages by score or remove messages with scores below a threshold. The process 400 may use social networking information or customer behavioral data to filter the messages for particular customers (or classes of customers). For example, the filtering may pass a message about a price drop for an item for customers who have not already purchased the item but may reject the message about the price drop for customers who have already purchased the item. The filtering at block 428 may improve the messaging by identifying the messages that have the most potential to drive traffic and sales to the catalog system 30.

At block 432, the process 400 communicates the message with the highest score to a messaging channel for a member of the social networking system. The messaging channel may be the news feeds of members or customers whom the message score indicates the item event information may be relevant or useful. In other cases, the messaging channel may be a personal message to the social networking channel, a personal electronic mail message, or a message to a mobile phone, e-book reader, or to a shopping application on such devices. For example, in the case of a message intended for the news feeds of certain social networking members, the messaging engines 43 may communicate the message via API calls to the service interface 58 of the social networking system 50. The social networking system 50 may post the message to the news feeds of the intended recipients.

At block 436, the process filters the remaining messages (if any) to determine their ability to effectively drive traffic and sales to the catalog system 30 or to engage the members of the social networking system 50 (e.g., to promote comments and likes). The filtering may be based (at least partially) on the scores associated with the remaining messages (e.g., to determine the highest ranked remaining messages), the times when previous messages were sent, messaging channels used for previous messages, etc. The filtering at block 436 can be used to determine whether to send or hold the next message or whether to send the message to a different messaging channel than previously sent messages.

For example, as described above, items posted to a news feed generally appear in the news feed for a time period before they are replaced by new items. This time period may be about 3 to 6 hours for some social networking systems. The filtering at block 436 may delay subsequent messages to a messaging channel so that at any time only one or a few messages from the catalog system are likely to be present in the messaging channel. This advantageously may increase the likelihood that a member will view the message and act on the message content by, for example, visiting or purchasing from the catalog system or liking or commenting on the message to the member's friends. In some cases, the filtering may determine that the next message should go to a different messaging channel than the previous message. For example, if a first message was posted to the news feeds, the next message may be communicated via personal e-mail to members or customers, and so forth. By selectively distributing messages among different messaging channels, the catalog system 30 may able to communicate a wide range of information that is helpful and effective without saturating a member's tolerance for receiving messages on a single messaging channel.

The process 400 continues at block 440 where the remaining messages are processed. For example, after the filtering at block 436, the next highest ranked message is communicated to members or customers. This process continues until there are no remaining messages that pass the filtering process. In some embodiments of the process 400, the blocks 412 to 440 are repeated for other social networking system to which catalog system customers have linked their catalog system accounts. Accordingly, personalized messages about item events can be communicated to any of a number of social networking systems.

Although certain processes have been described above in the context of products represented in a catalog, the processes shown in FIGS. 5 and 6 may be used to generate social networking customized display pages and messages for items and services such as, e.g., authors, artists, blogs, web sites, news articles, news feeds, restaurants, clubs, and organizations. Also, the system and methods disclosed herein can use any suitable information upon which to base customization or messaging including, but not limited to, social networking data (from one or more social networking systems), customer behavioral data derived from user interaction with the catalog system, or any other type of information about, e.g., habits, preferences, trends, or potential buying decisions of users or customers (e.g., advertising or marketing data, survey data, etc.).

V. CONCLUSION

Although described in the context of an electronic catalog system that retrieves profile data from a social networking system, the features and processes described above can also be implemented in a variety of other environments. As one example, some or all of the disclosed features can be implemented by the social networking system itself. As another example, the disclosed features could be implemented in the context of a personalized news site, in which case the retrieved social network profile data may be used to personalize delivery of content (e.g., news stories, news feeds, blog entries, etc.) to users of the news site or messages (e.g., marketing or informational messages) to users of the social networking.

Each of the processes, methods, and algorithms described in the preceding sections may be embodied in, and fully or partially automated by, code modules executed by one or more computers, computer processors, or machines configured to execute computer instructions. The code modules may be stored on any type of non-transitory computer-readable medium or computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for providing customized content based on social networking usage, the system comprising:
at least one non-transitory data repository configured to store (1) behavioral data for users of an electronic catalog system, the behavioral data reflective of item selection actions by the users of the catalog system, (2) social networking profile data of social networking contacts on a social networking system of the users of the electronic catalog system, and (3) account association data reflecting a link between a user's account on the electronic catalog system and the user's account on the social networking system; and
a physical computer system programmed to use data from the at least one data repository to:
determine, for a user of the electronic catalog system, a plurality of social networking contacts of the user;
determine, from the plurality of social networking contacts, a subset of social networking contacts who have accounts on the electronic catalog system;
determine behavioral patterns of the user and the subset of social networking contacts with regard to items available from the electronic catalog system;
generate, for the user, a social networking score reflective of potential for traffic to or selections of items from the catalog system, the social networking score based at least in part on (1) social networking data of the plurality of social networking contacts and (2) the behavioral patterns of the user and the subset of social networking contacts;
assign at least one of a default position or a default size to a personalized feature to be displayed on a plurality of display pages available from the electronic catalog system, wherein the personalized feature is configured to share an opinion of the user regarding an item advertised on a display page from the plurality of display pages with the plurality of social networking contacts of the user when the personalized feature is selected by the user;
based at least in part on the generated social networking score, change at least one of the default position to a new position or the default size to a new size; and
output a first display page for a first item for presentation to the user, wherein the first display page includes the personalized feature according to the at least one of the new position or the new size.

2. The system of claim 1, wherein the system is further configured to:
output a second display page for a second item for presentation to the user, the second item different from the first item, wherein the second display page includes the personalized feature according to the at least one of the new position or the new size.

3. The system of claim 1, wherein to generate the social networking score reflective of potential for traffic to or selections of items from the catalog system, the computer system is configured to determine one or more of: (1) potential for selection of items that may be frequently purchased together with the item or that may be marketed together with the item by the electronic catalog system, (2) the number of the social networking contacts who are in the subset of social networking contacts, (3) the number of the social networking contacts who are not in the subset of social networking contacts, (4) behavioral data of the social networking contacts who are in the subset of social networking contacts, or (5) behavioral data of proxies for the social networking contacts who are not in the subset of social networking contacts.

4. The system of claim 1, wherein the personalized feature is configured to allow the user to input a preference or rank for, or a comment about, an item described on the display page.

5. The system of claim 1, wherein the personalized feature includes at least one of (1) a recommendation of an item for the user or for a social networking contact of the user or (2) information about items that are popular among the plurality of social networking contacts of the user.

6. The system of claim 1, wherein the at least one non-transitory data repository is additionally configured to store user account data for users of the electronic catalog system, and the physical computer system is further programmed to:
analyze the social networking profile data and the user account data; and
update the account association data based at least in part on the analysis.

7. The system of claim 1, wherein the computer system is programmed to change the at least one of the default position to a new position or the default size to a new size by selecting content or appearance of the personalized feature based at least in part on whether the social networking score exceeds a threshold that is representative of light, moderate, or heavy usage of the social networking system by the user.

8. The system of claim 1, wherein the computer system is further programmed to:
analyze the social networking usage of users of the electronic catalog system; and
for users with sufficiently high social networking usage, provide an incentive to these users to post, to the electronic catalog system or to the social networking system, information about items available from the electronic catalog system.

9. The system of claim 1, wherein the computer system is part of the electronic catalog system, and the electronic catalog system is separate from the social networking system, the computer system further programmed to:
confirm that the user has authorized access by the electronic catalog system to the social networking system; and establish a link between an account of the user with the electronic catalog system and an account of the user with the social networking system.

10. The system of claim 9, wherein the personalized feature is configured to allow the user to provide input to the electronic catalog system, and the computer system is further programmed to communicate information about the user input to the social networking system.

11. A method for providing customized content based on social networking usage, the method comprising:

retrieving one or more of: (1) behavioral data for users of an electronic catalog system, the behavioral data reflective of item selection actions by the users of the catalog system, (2) social networking profile data of social networking contacts on a social networking system of the users of the electronic catalog system, or (3) account association data reflecting a link between a user's account on the electronic catalog system and the user's account on the social networking system;

determining, for a user of the electronic catalog system, a plurality of social networking contacts of the user;

determining, from the plurality of social networking contacts, a subset of social networking contacts who have accounts on the electronic catalog system;

determining behavioral patterns of the user and the subset of social networking contacts with regard to items available from the electronic catalog system;

generating, for the user, a social networking score reflective of potential for traffic to or selections of items from the catalog system, the social networking score based at least in part on (1) social networking data of the plurality of social networking contacts and (2) the behavioral patterns of the user and the subset of social networking contacts;

assigning at least one of a default position or a default size to a personalized feature to be displayed on a plurality of display pages available from the electronic catalog system, wherein the personalized feature is configured to share an opinion of the user regarding an item advertised on a display page from the plurality of display pages with the plurality of social networking contacts of the user when the personalized feature is selected by the user;

based at least in part on the generated social networking score, changing at least one of the default position to a new position or the default size to a new size; and outputting a first display page for a first item for presentation to the user, wherein the first display page includes the personalized feature according to the at least one of the new position or the new size, wherein the method is performed in its entirety by a computer system comprising one or more machines.

12. The method of claim 11, wherein the method further comprises:

outputting a second display page for a second item for presentation to the user, the second item different from the first item, wherein the second display page includes the personalized feature according to the at least one of the new position or the new size.

13. The method of claim 11, wherein generating the social networking score reflective of potential for traffic to or selections of items from the catalog system comprises determining one or more of: (1) potential for selection of items that may be frequently purchased together with the item or that may be marketed together with the item by the electronic catalog system, (2) the number of the social networking contacts who are in the subset of social networking contacts, (3) the number of the social networking contacts who are not in the subset of social networking contacts, (4) behavioral data of the social networking contacts who are in the subset of social networking contacts, or (5) behavioral data of proxies for the social networking contacts who are not in the subset of social networking contacts.

14. The method of claim 11, wherein changing the at least one of the default position to a new position or the default size to a new size comprises selecting content or appearance of the personalized feature based at least in part on whether the social networking score exceeds a threshold that is representative of light, moderate, or heavy usage of the social networking system by the user.

15. The method of claim 11, further comprising:

analyzing the social networking usage of users of the electronic catalog system; and for users with sufficiently high social networking usage, providing an incentive to these users to post, to the electronic catalog system or to the social networking system, information about items available from the electronic catalog system.

16. Non-transitory computer storage having stored thereon instructions that, when executed by a computer system having computer storage, cause the computer system to perform a method for providing customized content based on social networking usage, the method comprising:

retrieving one or more of: (1) behavioral data for users of an electronic catalog system, the behavioral data reflective of item selection actions by the users of the catalog system, (2) social networking profile data of social networking contacts on a social networking system of the users of the electronic catalog system, or (3) account association data reflecting a link between a user's account on the electronic catalog system and the user's account on the social networking system;

determining, for a user of the electronic catalog system, a plurality of social networking contacts of the user;

determining, from the plurality of social networking contacts, a subset of social networking contacts who have accounts on the electronic catalog system;

determining behavioral patterns of the user and the subset of social networking contacts with regard to items available from the electronic catalog system;

generating, for the user, a social networking score reflective of potential for traffic to or selections of items from the catalog system, the social networking score based at least in part on (1) social networking data of the plurality of social networking contacts and (2) the behavioral patterns of the user and the subset of social networking contacts;

assigning at least one of a default position or a default size to a personalized feature to be displayed on a plurality of display pages available from the electronic catalog system, wherein the personalized feature is configured to share an opinion of the user regarding an item advertised on a display page from the plurality of display pages with the plurality of social networking contacts of the user when the personalized feature is selected by the user;

based at least in part on the generated social networking score, changing at least one of the default position to a new position or the default size to a new size; and outputting a first display page for a first item for presentation to the user, wherein the first display page includes the personalized feature according to the at least one of the new position or the new size.

17. The non-transitory computer storage of claim 16, wherein the method further comprises:

outputting a second display page for a second item for presentation to the user, the second item different from the first item, wherein the second display page includes the personalized feature according to the at least one of the new position or the new size.

18. The non-transitory computer storage of claim 16, wherein generating the social networking score reflective of potential for traffic to or selections of items from the catalog system comprises determining one or more of: (1) potential for selection of items that may be frequently purchased together with the item or that may be marketed together with the item by the electronic catalog system, (2) the number of the social networking contacts who are in the subset of social networking contacts, (3) the number of the social networking contacts who are not in the subset of social networking contacts, (4) behavioral data of the social networking contacts who are in the subset of social networking contacts, or (5) behavioral data of proxies for the social networking contacts who are not in the subset of social networking contacts.

19. The non-transitory computer storage of claim 16, wherein changing the at least one of the default position to a new position or the default size to a new size comprises selecting content or appearance of the personalized feature based at least in part on whether the social networking score exceeds a threshold that is representative of light, moderate, or heavy usage of the social networking system by the user.

20. The non-transitory computer storage of claim 16, further comprising:

analyzing the social networking usage of users of the electronic catalog system; and for users with sufficiently high social networking usage, providing an incentive to these users to post, to the electronic catalog system or to the social networking system, information about items available from the electronic catalog system.

\* \* \* \* \*